(12) United States Patent
Shima

(10) Patent No.: US 6,759,944 B1
(45) Date of Patent: Jul. 6, 2004

(54) RADIO SELECTIVE-CALLING RECEIVER WITH DISPLAYING FUNCTION

(75) Inventor: Makoto Shima, Shizuoka (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/339,543

(22) Filed: Jun. 24, 1999

(30) Foreign Application Priority Data

Jun. 29, 1998 (JP) .......................................... 10-183113

(51) Int. Cl.$^7$ .............................................. H04Q 7/14
(52) U.S. Cl. ................................................... 340/7.55
(58) Field of Search .............................. 340/7.55, 7.51, 340/7.52, 7.56, 7.59, 7.61, 7.32, 7.1, 825.22, 7.62; 235/380

(56) References Cited

U.S. PATENT DOCUMENTS

| | | | |
|---|---|---|---|
| 4,704,608 A | * 11/1987 | Sato et al. .................. | 340/7.62 |
| 4,769,641 A | * 9/1988 | Yoshizawa et al. ......... | 340/7.55 |
| 4,786,902 A | * 11/1988 | Davis et al. ............... | 340/7.55 |
| 4,975,694 A | * 12/1990 | McLaughlin et al. ...... | 340/7.55 |
| 5,192,947 A | * 3/1993 | Neustein ..................... | 235/380 |
| 5,258,751 A | * 11/1993 | DeLuca et al. ............. | 340/7.52 |
| 5,285,426 A | * 2/1994 | Teodoridis .................. | 340/7.55 |
| 5,436,619 A | * 7/1995 | Yun ........................... | 340/7.52 |
| 5,493,280 A | * 2/1996 | Shibayama ................. | 340/7.55 |
| 5,499,019 A | * 3/1996 | Burgan et al. .......... | 340/825.22 |
| 5,703,572 A | * 12/1997 | Miyashita et al. ......... | 340/7.62 |
| 5,861,818 A | * 1/1999 | Ohtsuki ..................... | 340/7.52 |
| 5,870,030 A | * 2/1999 | DeLuca et al. ............. | 340/7.48 |
| 5,872,521 A | * 2/1999 | Lopatukin et al. ......... | 340/7.52 |
| 5,936,548 A | * 8/1999 | Takatsuka .................. | 340/7.52 |
| 6,014,086 A | * 1/2000 | Miyashita ................... | 340/7.6 |
| 6,060,998 A | * 5/2000 | Miyashita .................. | 340/7.55 |
| 6,313,736 B1 | * 11/2001 | Hymel et al. .............. | 340/7.56 |

FOREIGN PATENT DOCUMENTS

| | | |
|---|---|---|
| JP | 58-501569 | 9/1983 |
| JP | 4-273727 | 9/1992 |
| JP | 5-95322 | 4/1993 |
| JP | 5-35632 | 9/1993 |
| JP | 6-14520 | 4/1994 |
| JP | 6-237206 | 8/1994 |
| JP | 7-79459 | 3/1995 |
| JP | 7-203509 | 8/1995 |
| JP | 10-94009 | 4/1998 |

* cited by examiner

Primary Examiner—Edwin C. Holloway, III
(74) Attorney, Agent, or Firm—Scully, Scott, Murphy & Presser

(57) ABSTRACT

A radio selective-calling receiver with a displaying function, which can clearly distinguish the difference between a confirmed message and an unconfirmed message by a user, is provided. A controller makes a memory memorize a newly received message. At the time when the memorized message is read out and is displayed on the displaying section, the controller makes an unconfirmed symbol flash in order to show that the message is an unconfirmed message. At the case that an input of a switch by the user, which is the confirming operation by the user, is not implemented within the predetermined time, the controller sets an automatic informing stop status at the information of automatic informing stop memorizing section in a memory. And the controller also makes a message memorizing section memorize the message as a message having an unconfirmed state. Therefore, at the time when the unconfirmed message is displayed again on the displaying section, the unconfirmed message is displayed with the unconfirmed symbol in a flashing state. With this, the distinction between the confirmed message and the unconfirmed message becomes clear.

12 Claims, 18 Drawing Sheets

F I G. 2
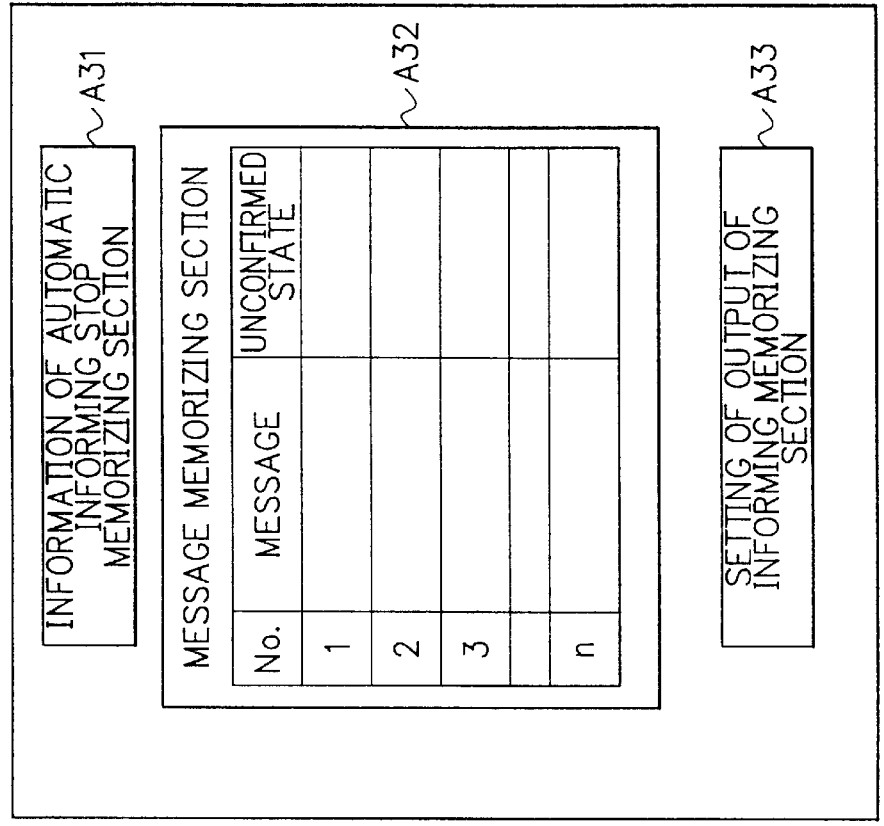
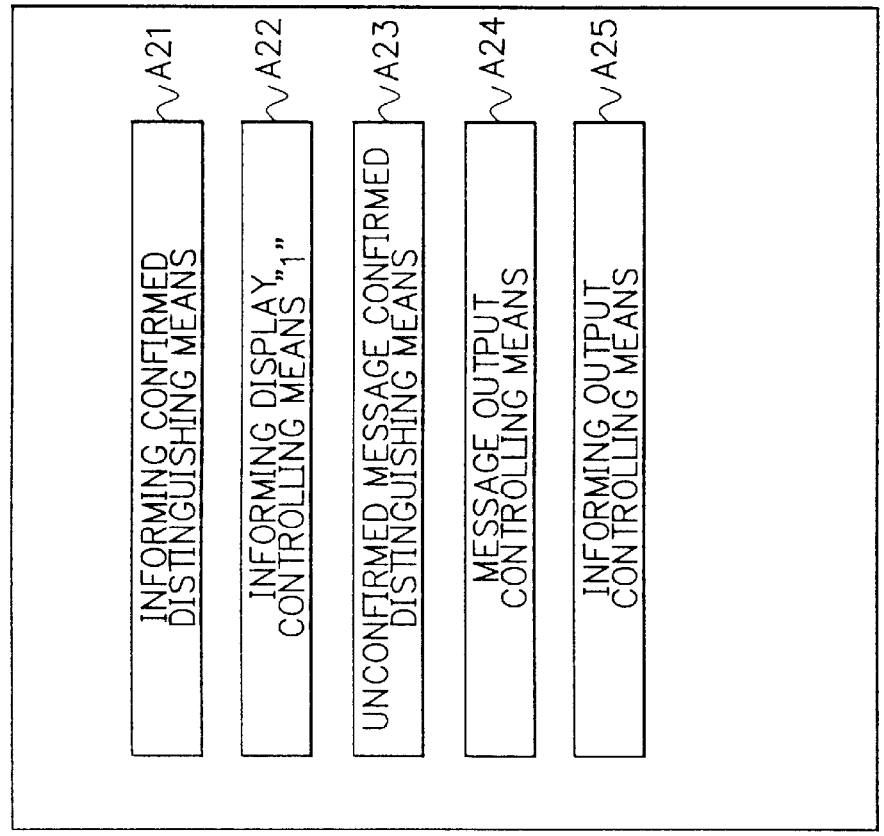

FIG. 7
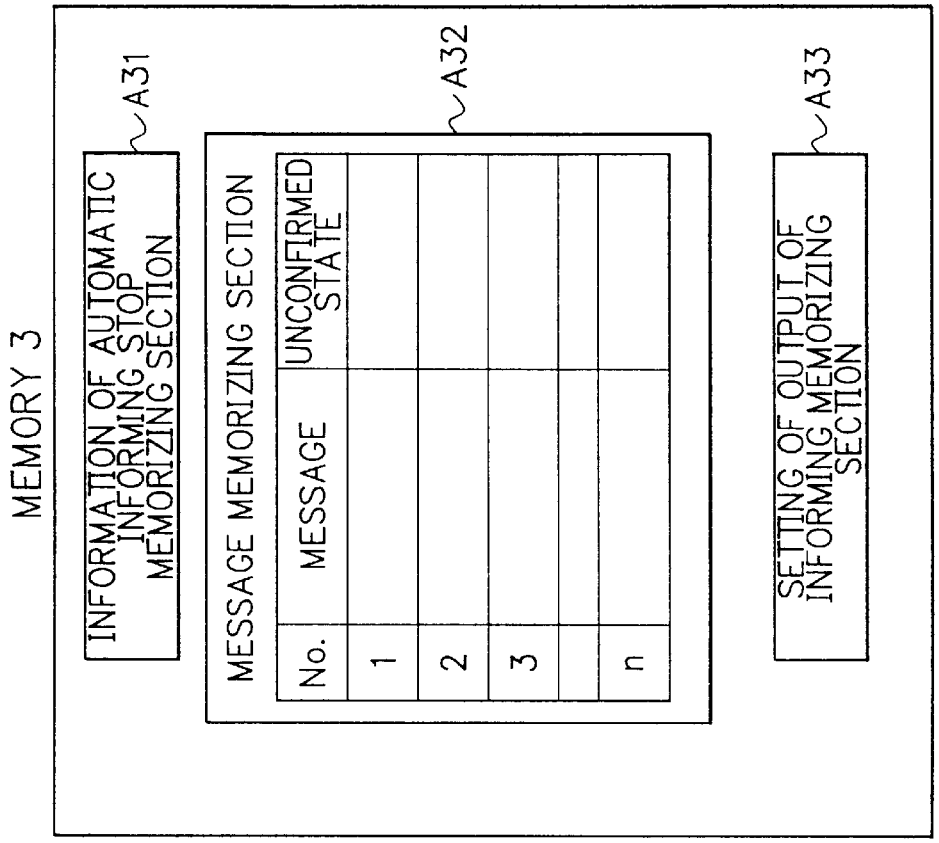
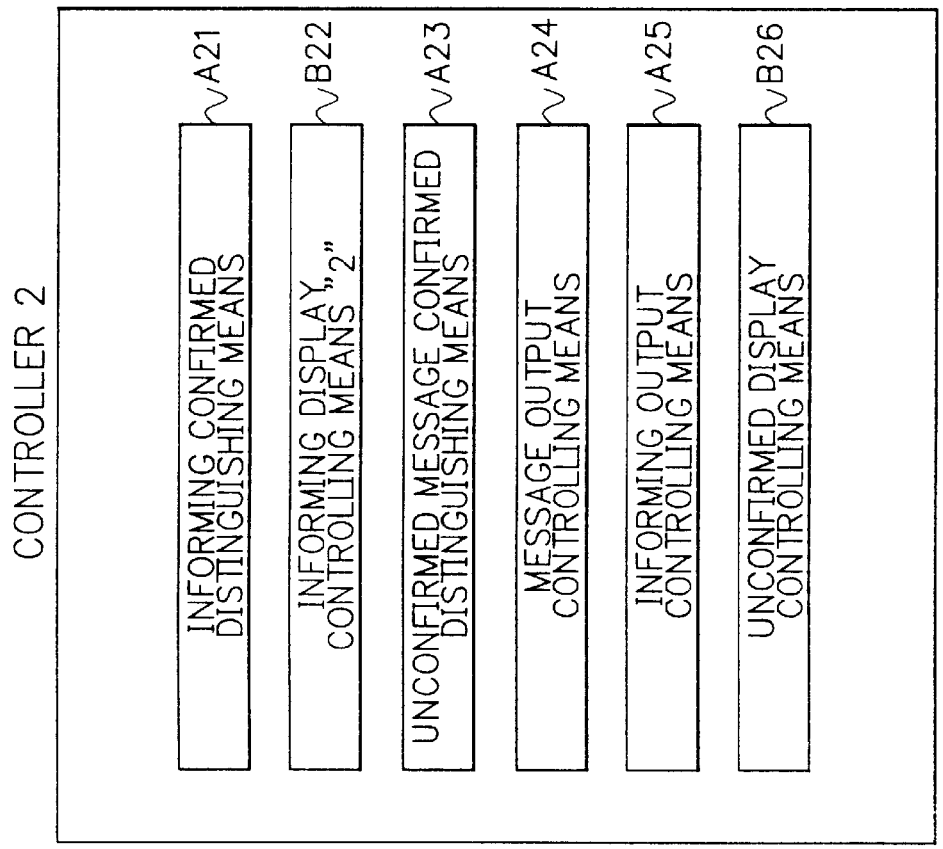

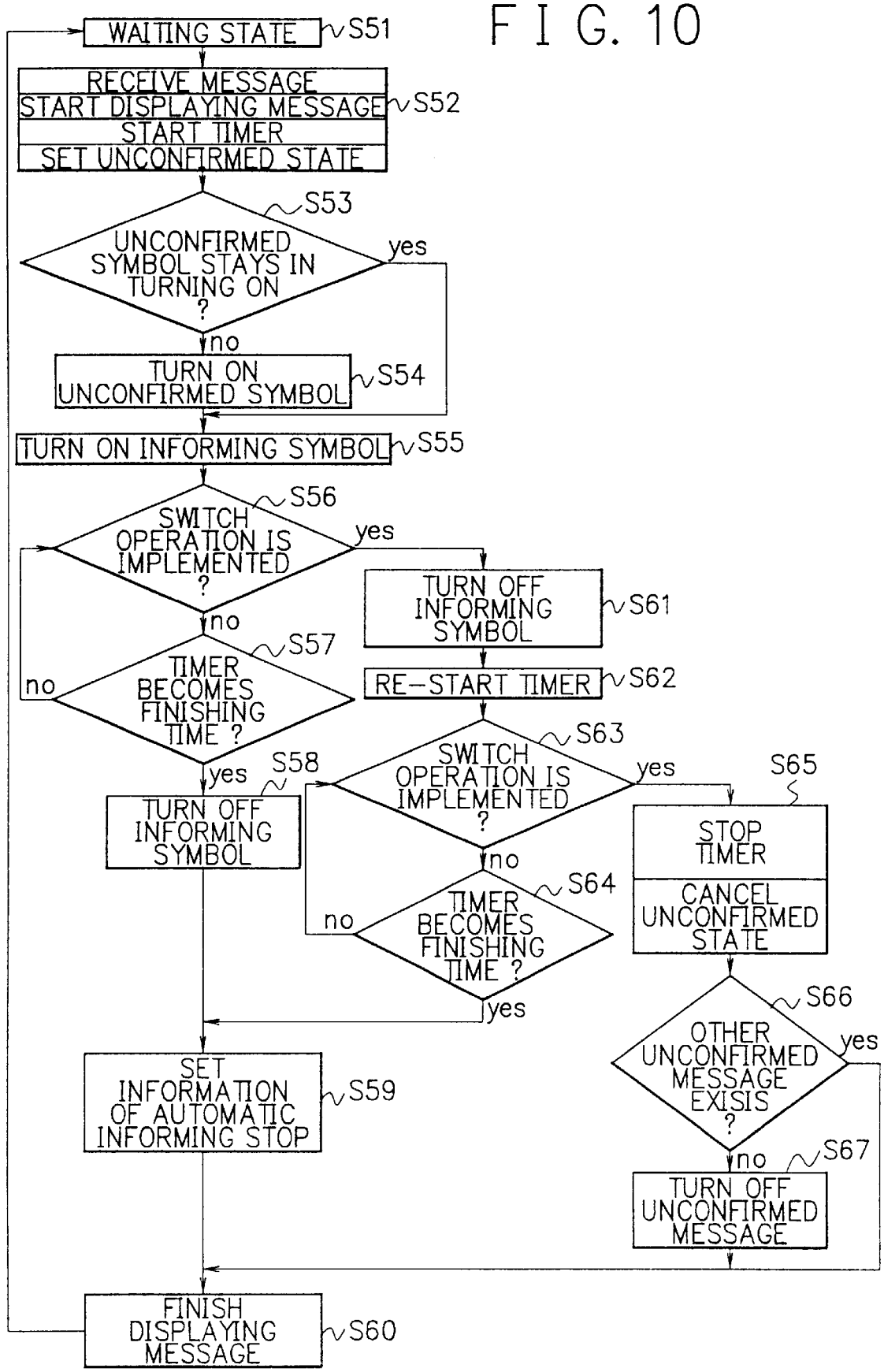
F I G. 10

FIG. 12

CONTROLLER 2
- INFORMING CONFIRMED DISTINGUISHING MEANS ~A21
- UNCONFIRMED MESSAGE CONFIRMED DISTINGUISHING MEANS ~A23
- MESSAGE OUTPUT CONTROLLING MEANS ~A24
- INFORMING OUTPUT CONTROLLING MEANS ~A25
- UNCONFIRMED DISPLAY CONTROLLING MEANS ~B26
- BACKGROUND PICTURE DISPLAY CONTROLLING MEANS ~C27

MEMORY 3
- INFORMATION OF AUTOMATIC INFORMING STOP MEMORIZING SECTION ~A31
- MESSAGE MEMORIZING SECTION ~A32

| No. | MESSAGE | UNCONFIRMED STATE |
|---|---|---|
| 1 | | |
| 2 | | |
| 3 | | |
| n | | |

- SETTING OF OUTPUT OF INFORMING MEMORIZING SECTION ~A33

F I G. 13
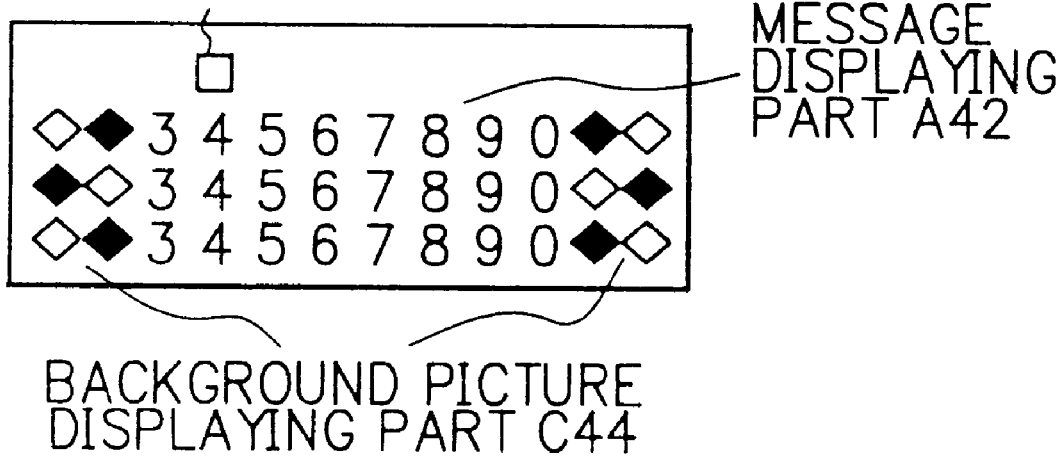

FIG. 14
DISPLAYING SECTION 4
(a) WAITING STATE
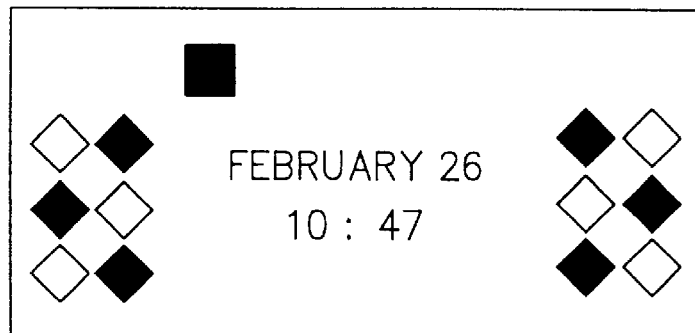
(b) INFORMING
(c) CONFIRMED INFORMING OR FINISHED INFORMING TIME
(d) FINISH DISPLAYING
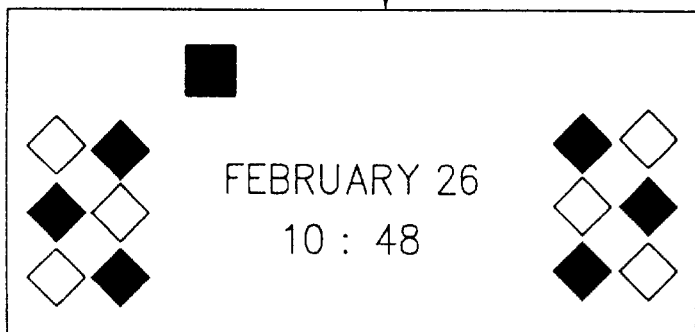

FIG. 17

CONTROLLER 2
- A21: INFORMING CONFIRMED DISTINGUISHING MEANS
- A23: UNCONFIRMED MESSAGE CONFIRMED DISTINGUISHING MEANS
- A24: MESSAGE OUTPUT CONTROLLING MEANS
- A25: INFORMING OUTPUT CONTROLLING MEANS
- D28: INFORMING GUIDANCE ADDING MEANS

MEMORY 3
- A31: INFORMATION OF AUTOMATIC INFORMING STOP MEMORIZING SECTION
- A32: MESSAGE MEMORIZING SECTION

| No. | MESSAGE | UNCONFIRMED STATE |
|---|---|---|
| 1 | | |
| 2 | | |
| 3 | | |
| n | | |

- A33: SETTING OF OUTPUT OF INFORMING MEMORIZING SECTION

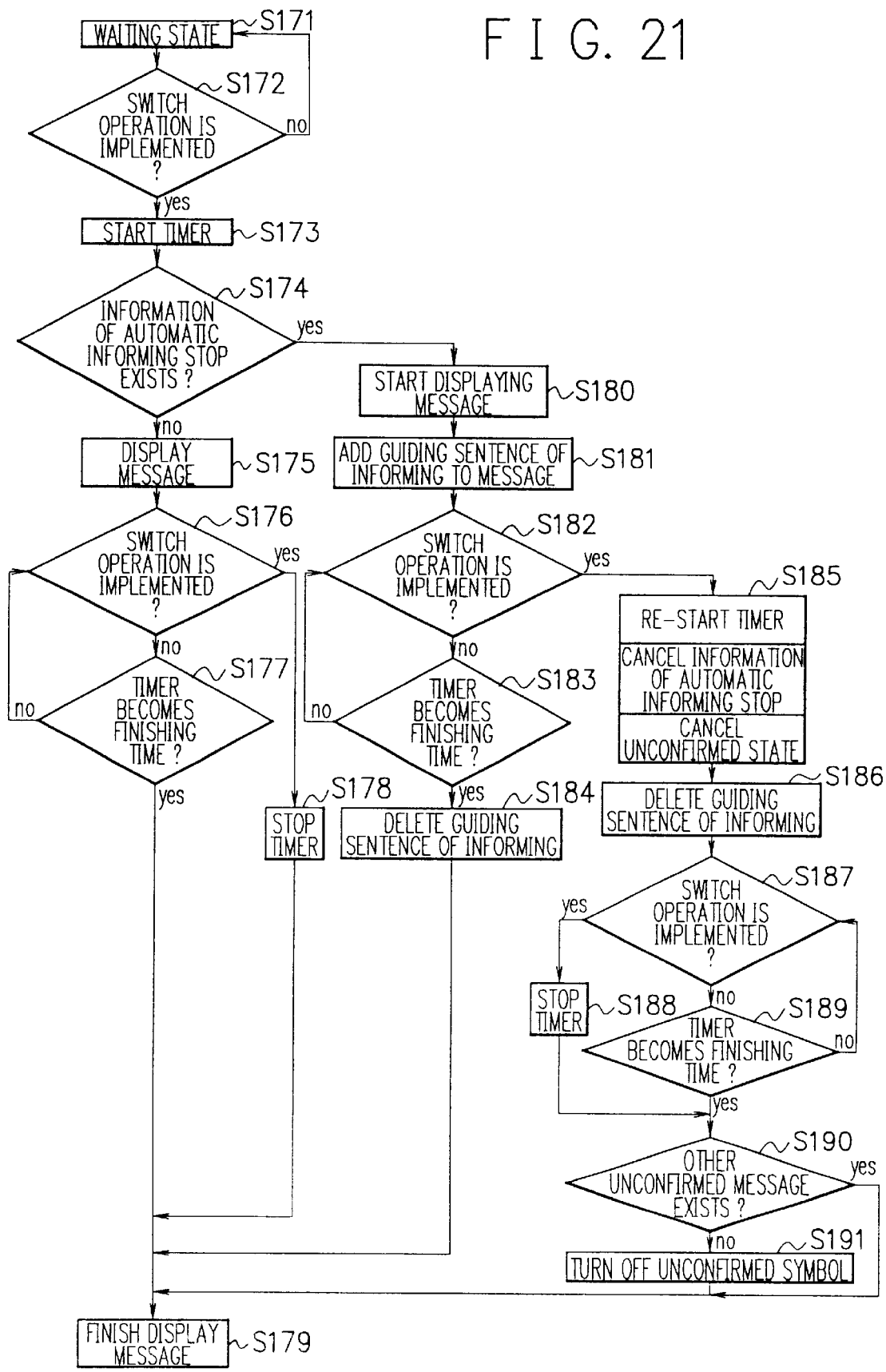
F I G. 21

RADIO SELECTIVE-CALLING RECEIVER WITH DISPLAYING FUNCTION

BACKGROUND OF THE INVENTION

The present invention relates to a radio selective-calling receiver with a displaying function.

DESCRIPTION OF THE RELATED ART

A conventional radio selective-calling receiver informs the calling to the user by such as, a sound, a vibration, a light of an LED (light emitting diode) and a display displayed the message on the display, at the time when the message is received. The user can freely set the informing means selecting the vibration instead of the sound, or only displaying the message on the display not selecting the vibration, the sound and the light of the LED, under the various circumstances.

However, some radio selective-calling receivers do not have an LED circuit because of the reduction of the number of parts and the reduction of mounting process. At the case that the sound and the vibration are not set, there is a problem that the message is not clear whether the message displayed on the display is a newly received message or a re-displaying message that has been already read and confirmed.

Recently, some user may receives scores of messages a day by the expansion of the information receiving service, and at the case that a new message is received while a received message is read, the situation becomes complex and the above mentioned problem may occur.

That is, the problem is that the message displaying on the display is whether the message is a re-displaying message displayed once but not confirmed by the user or the message confirmed by the user. Therefore, there is a problem that even the message is confirmed by the user, the message is stored at a memory as an unconfirmed message.

The Japanese Patent Application Laid-Open No. SHO 58-501569 discloses a pager with a visual display apparatus displaying a message that has not been read. In this pager, at the time when a new message is received, the displaying section is flashed, and the flashing of the displaying section is finished at the time when the message is read out on the displaying section. The main object of this pager is that the user can recognize the message even at the time when the pager is set to be a silent state. At the time when the message is read, the display of a flashing signal is finished. However, at the case that the messages to be read are exceeded the memory capacity, the exceeded messages are deleted, even the messages have not been read.

The Japanese Patent Application Laid-Open No. HEI 4-273727 discloses a radio selective-calling receiver with an informing function of an unconfirmed message. This receiver informs an unconfirmed message to the user by mainly flashing an LED (light emitting diode) in every predetermined time interval at the time when the unconfirmed message exists.

The Japanese Utility Model Application Laid-Open No. HEI 5-35632 discloses a selective-calling receiver with a displaying function. In this receiver, the newly received messages are memorized in a memory and the messages are read out in sequence. At the time when a message that has not been displayed exists, the message is displayed.

The Japanese Utility Model Application Laid-Open No. HEI 6-14520 discloses a selective-calling receiver with a displaying function. This receiver has a protecting function of messages and also has a deleting function of the protected messages.

The Japanese Patent Application Laid-Open No. HEI 5-95322 discloses a portable type message receiver. This receiver has touch switches on the surface of the body of the receiver. At the case that unconfirmed messages exist in a memory, at the time when the user touches the body of the receiver, the touch switch works and the receiver informs the user that some unconfirmed message exists by mainly a sound.

The Japanese Patent Application Laid-Open No. HEI 7-79459 discloses a selective-calling receiver. In this receiver, at the case that the number of unconfirmed messages in a memory exceeds the predetermined number, the request of informing start is set and the existence of unconfirmed messages is informed to the user by a sound or a light or a vibration.

In the mentioned above conventional application, there are problems that some application deletes the unconfirmed messages due to the limit of the memory capacity and some application only displays unconfirmed messages.

SUMMARY OF THE INVENTION

It is therefore an object of the present invention to provide a radio selective-calling receiver with a displaying function which can clearly distinguish the messages. That is, the message is distinguished as a confirmed message whose contents is confirmed by the user or a newly received unconfirmed message or an unconfirmed message which has been once received but has not been confirmed by the user.

According to a first aspect of the present invention, for achieving the above mentioned objects, a radio selective-calling receiver with a displaying function, which memorizes messages included in selective-calling signals in a memory means at the time when the selective-calling signals addressed to own receiver are received and reads out the memorized messages from the memory means and displays the messages on the displaying means, provides a controlling means which controls to make said displaying means display a predetermined display in order to inform that the new message was received, at the time when a newly received message is memorized in said memory means and said message is read out from said memory means and is displayed on said displaying means.

According to a second aspect of the present invention, in the first aspect, said controlling means controls to make said displaying means display the message with said predetermined display, at the time when the message was displayed on said displaying means in predetermined time but was not confirmed by the user and is read out from said memory means and is displayed again on said displaying means.

According to a third aspect of the present invention, in the first aspect, said predetermined display is a flashing state of symbol at the time when the unconfirmed message is displayed on said displaying means and is a turning on state of symbol at the time when the unconfirmed message is not displayed on said displaying means.

According to a fourth aspect of the present invention, in the first aspect, said predetermined display is a turning on state of symbol at the time when the unconfirmed message is displayed on said displaying means and is a turning off state of symbol at the time when the unconfirmed message is not displayed on said displaying means.

According to a fifth aspect of the present invention, in the first aspect, said controlling means makes said symbol turn on, at the case that the unconfirmed messages for the user exist in said memory means, except the time when a newly received message is displaying on said displaying means or when the message was displayed in said predetermined time on said displaying means but was not confirmed by the user and the message is read out from said memory means and is displaying again.

According to a sixth aspect of the present invention, in the first aspect, said displaying means comprises a display which makes a second symbol turn on at the case that the unconfirmed messages exist in said memory means.

According to a seventh aspect of the present invention, in the first aspect, said predetermined display is a flashing state of a background of the message displaying area.

According to a eighth aspect of the present invention, in the first aspect, said predetermined display is a display of a background picture showing that the message displaying on said displaying means is an unconfirmed message.

According to a ninth aspect of the present invention, in the first aspect, said predetermined display is a display of letters displayed on a message displaying area of said displaying means.

According to a tenth aspect of the present invention, in order to achieve the mentioned above objects, a radio selective-calling receiver with a displaying function, provides a memory means for memorizing received messages, a displaying means for displaying said messages memorized in said memory means, an operation inputting means for inputting the setting of a user, and a controlling means for controlling mentioned above means. And said displaying means provides a symbol which changes displaying states at the time when an unconfirmed message is displaying and the unconfirmed message stays in said memory means. And said controlling means provides an informing confirmed distinguishing means for distinguishing whether operation inputting that a user confirms a message displayed by said operation inputting means was implemented or not, at the time when a newly received message is displayed on said displaying means, an unconfirmed message confirmed distinguishing means for distinguishing whether operation inputting that a user confirms a message displayed by said operation inputting means was implemented or not, at the time when a message memorized in an unconfirmed state in said memory means is displayed on said displaying means, and an informing display controlling means for controlling the displaying state of said symbol, based on the distinguished result by said informing confirmed distinguishing means and said unconfirmed message confirmed distinguishing means. And said memory means provides information of automatic informing stop memorizing section which memorizes the distinguished result by said informing confirmed distinguishing means, and an unconfirmed state memorizing section which memorizes the confirmed result of each message by said unconfirmed message confirmed distinguishing means. And said controlling means, at the time when said controlling means makes said memory means memorize the newly received message and makes said displaying means display said message by making said memory means read out said memorized message, makes said symbol flash to show that a new message is received, by the control of said informing display controlling means, and watches the operation inputting from said operation inputting means by said informing confirmed distinguishing means and said unconfirmed message confirmed distinguishing means for the predetermined time. And said controlling means, at the case that said operation inputting from said operation inputting means can not be detected by said informing confirmed distinguishing means and said unconfirmed message confirmed distinguishing means within the predetermined time, makes said symbol switch from flashing to turning on by said informing display controlling means and also makes the memory means memorize the displayed message in said information of automatic informing stop memorizing section as the information of automatic informing stop and makes the memory means memorize the displayed message in said unconfirmed state memorizing section as the information having unconfirmed state. And said controlling means, at the case that said operation inputting from said operation inputting means is detected by said informing confirmed distinguishing means and said unconfirmed message confirmed distinguishing means within the predetermined time, makes said symbol switch from flashing to turning on by said informing display controlling means and detects whether messages having unconfirmed state exist or not at said unconfirmed state memorizing section in said memory means, and at the case that messages having unconfirmed state are detected, makes said symbol stay in turning on, and at the case that messages having unconfirmed state can not be detected, makes said symbol turn off. And said controlling means, at the case that the designated operation inputting is implemented from said operation inputting means at the state that the information of automatic informing stop exists in said information of automatic informing stop memorizing section, makes the messages memorized as the information of automatic informing stop in said information of automatic informing stop memorizing section display on said displaying means, and also makes said symbol switch from turning on to flashing by said informing display controlling means and watches the operation inputting from said operation inputting means by said informing confirmed distinguishing means and said unconfirmed message confirmed distinguishing means for the predetermined time. And said controlling means, at the case that said operation inputting from said operation inputting means can not be detected by said informing confirmed distinguishing means and said unconfirmed message confirmed distinguishing means within the predetermined time, makes said symbol switch from flashing to turning on by said informing display controlling means. And said controlling means, at the case that said operation inputting from said operation inputting means is detected by said informing confirmed distinguishing means and said unconfirmed message confirmed distinguishing means within the predetermined time, makes said information of automatic informing stop and said unconfirmed state of the message displayed by switching said symbol flashing to turning on by said informing display controlling means cancel, and detects whether the other messages memorized as the information of automatic informing stop in said information of automatic informing stop memorizing section exist or not. And said controlling means, at the case that the other messages memorized as said information of automatic informing stop in said information of automatic informing stop memorizing section exist, makes said messages display on said displaying means and also makes said symbol switch from turning on to flashing by said informing display controlling means. And said controlling means, at the case that the other messages memorized as said information of automatic informing stop in said information of automatic informing stop memorizing section do not exist, makes said symbol turn off by said informing display controlling means.

According to an eleventh aspect of the present invention, in order to achieve the mentioned above objects, a radio selective-calling receiver with a displaying function, provides a memory means for memorizing received messages, a displaying means for displaying said messages memorized in said memory means, an operation inputting means for inputting the setting of a user, and a controlling means for controlling mentioned above means. And said displaying means provides a first display which is displayed at the time when an unconfirmed message is displayed, a second display which is displayed at the time when the display of said unconfirmed message is finished, a third display which is displayed at the case that the unconfirmed messages exist in the messages memorized in said memory means, and a fourth display which is displayed at the case that the unconfirmed messages do not exist in the messages memorized in said memory means. And said controlling means provides an informing confirmed distinguishing means for distinguishing whether an operation inputting that a user confirms a message displayed by said operation inputting means was implemented or not, at the time when a newly received message is displayed on said displaying means, an unconfirmed message confirmed distinguishing means for distinguishing whether an operation inputting that a user confirms a message displayed by said operation inputting means was implemented or not, at the time when a message memorized in an unconfirmed state in said memory means is displayed on said displaying means, a first switching means for switching said first display and said second display, based on the distinguished result by said informing confirmed distinguishing means and said unconfirmed message confirmed distinguishing means, and a second switching means for switching said third display and said fourth display, based on the distinguished result by said unconfirmed message confirmed distinguishing means. And said memory means provides information of automatic informing stop memorizing section which memorizes the distinguished result by said informing confirmed distinguishing means, and an unconfirmed state memorizing section which memorizes the confirmed result of each message by said unconfirmed message confirmed distinguishing means. And said controlling means, at the time when said controlling means makes said memory means memorize the newly received message and makes said displaying means display said message by making said memory means read out said memorized message, makes said displaying means display said first display and said third display by said first switching means and said second switching means, and watches the operation inputting from said operation inputting means by said informing confirmed distinguishing means and said unconfirmed message confirmed distinguishing means for the predetermined time. And said controlling means, at the case that said operation inputting from said operation inputting means is detected by said informing confirmed distinguishing means and said unconfirmed message confirmed distinguishing means within the predetermined time, makes said first switching means switch said first display to said second display and makes the memory means memorize the displayed message as the information having no unconfirmed state at said unconfirmed state memorizing section in said memory means, and detects whether the other messages having unconfirmed state exist or not in said unconfirmed state memorizing section, and at the case that the other messages having unconfirmed state exist, makes said second display and said third display stay in displaying, at the case that the other messages having unconfirmed state do not exist, makes said second switching means switch said third display to said fourth display. And said controlling means, at the case that said operation inputting from said operation inputting means can not be detected by said informing confirmed distinguishing means and said unconfirmed message confirmed distinguishing means within the predetermined time, makes said first switching means switch said first display to said second display and also makes said memory means memorize the displayed message as the information of automatic informing stop in said information of automatic informing stop memorizing section and makes said memory means memorize the displayed message as the message having unconfirmed state in said unconfirmed state memorizing section. And said controlling means, at the case that the designated operation inputting is implemented from said operation inputting means at the state that the memorized messages exist as the information of automatic informing stop in said information of automatic informing stop memorizing section, makes the messages memorized as the information of automatic informing stop in said information of automatic informing stop memorizing section display on said displaying means, and also makes said first switching means switch the display of said displaying means from said second display to said first display and watches the operation inputting from said operation inputting means by said informing confirmed distinguishing means and said unconfirmed message confirmed distinguishing means for the predetermined time. And said controlling means, at the case that said operation inputting from said operation inputting means can not be detected by said informing confirmed distinguishing means and said unconfirmed message confirmed distinguishing means within the predetermined time, makes said first switching means switch said first display to said second display. And said controlling means, at the case that said operation inputting from said operation inputting means is detected by said informing confirmed distinguishing means and said unconfirmed message confirmed distinguishing means within the predetermined time, makes said first switching means switch said first display to said second display and makes said information of automatic informing stop and said unconfirmed state of the message displayed by said unconfirmed state memorizing section cancel, and detects whether the other messages memorized as the information of automatic informing stop in said information of automatic informing stop memorizing section exist or not. And said controlling means, at the case that the other messages memorized as said information of automatic informing stop in said information of automatic informing stop memorizing section exist, makes said messages display on said displaying means and also makes said first switching means switch said second display to said first display. And said controlling means, at the case that the other messages memorized as said information of automatic informing stop in said information of automatic informing stop memorizing section do not exist, makes said second switching means switch said third display to said fourth display.

According to a twelfth aspect of the present invention, in the eleventh aspect, said first display is an informing symbol in turning on state which shows that said unconfirmed message is in displaying state on said displaying means, and said second display is said informing symbol in turning off state, and said third display is an unconfirmed symbol in turning on state which shows that unconfirmed messages exist in said memory means, and said fourth display is said unconfirmed symbol in turning off state, and said first switching means switches said informing symbol to turning on and turning off, based on the distinguished result by said informing confirmed distinguishing means, and said second switching means switches said unconfirmed symbol to turning on and turning off, based on the distinguished result by said unconfirmed message confirmed distinguishing means.

According to a thirteenth aspect of the present invention, in the eleventh aspect, said first display is an informing symbol in flashing state which shows that said unconfirmed message is in displaying state on said displaying means, and said second display is said informing symbol in turning on state, and said third display is an unconfirmed symbol in turning on state which shows that unconfirmed messages exist in said memory means, and said fourth display is said unconfirmed symbol in turning off state, and said first switching means switches said informing symbol to flashing and turning on, based on the distinguished result by said informing confirmed distinguishing means, and said second switching means switches said unconfirmed symbol to turning on and turning off, based on the distinguished result by said unconfirmed message confirmed distinguishing means.

According to a fourteenth aspect of the present invention, in the eleventh aspect, said first display is a background, which is in a message displaying area displaying the message, is in flashing state, and said second display is said background in turning on state, and said third display is an unconfirmed symbol in turning on state which shows that unconfirmed messages exist in said memory means, and said fourth display is said unconfirmed symbol in turning off state, and said first switching means switches said background to flashing and turning on, based on the distinguished result by said informing confirmed distinguishing means, and said second switching means switches said unconfirmed symbol to turning on and turning off, based on the distinguished result by said unconfirmed message confirmed distinguishing means.

According to a fifteenth aspect of the present invention, in the eleventh aspect, said first display is a background in displaying state which shows that a message displayed on said displaying means is an unconfirmed message, and said second display is said background in turning off state, and said third display is an unconfirmed symbol in turning on state which shows that unconfirmed messages exist in said memory means, and said fourth display is said unconfirmed symbol in turning off state, and said first switching means switches said background in displaying state and in turning off state, based on the distinguished result by said informing confirmed distinguishing means, and said second switching means switches said unconfirmed symbol to turning on and turning off, based on the distinguished result by said unconfirmed message confirmed distinguishing means.

According to a sixteenth aspect of the present invention, in the eleventh aspect, said first display is designated information of letters displayed on the message displaying area displaying the message, and said second display is said designated information of letters in turning off state, and said third display is an unconfirmed symbol in turning on state which shows that unconfirmed messages exist in said memory means, and said fourth display is said unconfirmed symbol in turning off state, and said first switching means switches said designated information of letters in adding state and in deleting state, based on the distinguished result by said informing confirmed distinguishing means, and said second switching means switches said unconfirmed symbol to turning on and turning off, based on the distinguished result by said unconfirmed message confirmed distinguishing means.

BRIEF DESCRIPTION OF THE DRAWINGS

The objects and features of the present invention will become more apparent from the consideration of the following detailed description taken in conjunction with the accompanying drawings in which:

FIG. 2 is a diagram showing the construction of a controller and a memory of a first embodiment of the present invention;

FIG. 7 is a diagram showing the construction of a controller and a memory of a second embodiment of the present invention;

FIG. 10 is a flowchart showing the informing operation at the time when the message is received in the second embodiment of the present invention;

FIG. 12 is a diagram showing the construction of a controller and a memory of a third embodiment of the present invention;

FIG. 13 is a diagram showing the construction of a displaying section of the third embodiment of the present invention;

FIG. 14 is a displaying diagram showing a displaying example of the third embodiment of the present invention;

FIG. 17 is a diagram showing the construction of a controller and a memory of the fourth embodiment of the present invention;

FIG. 21 is a flowchart showing the operation when the re-informing operation is implemented at the fourth embodiment.

DESCRIPTION OF THE PREFERRED EMBODIMENTS

Figure 1:
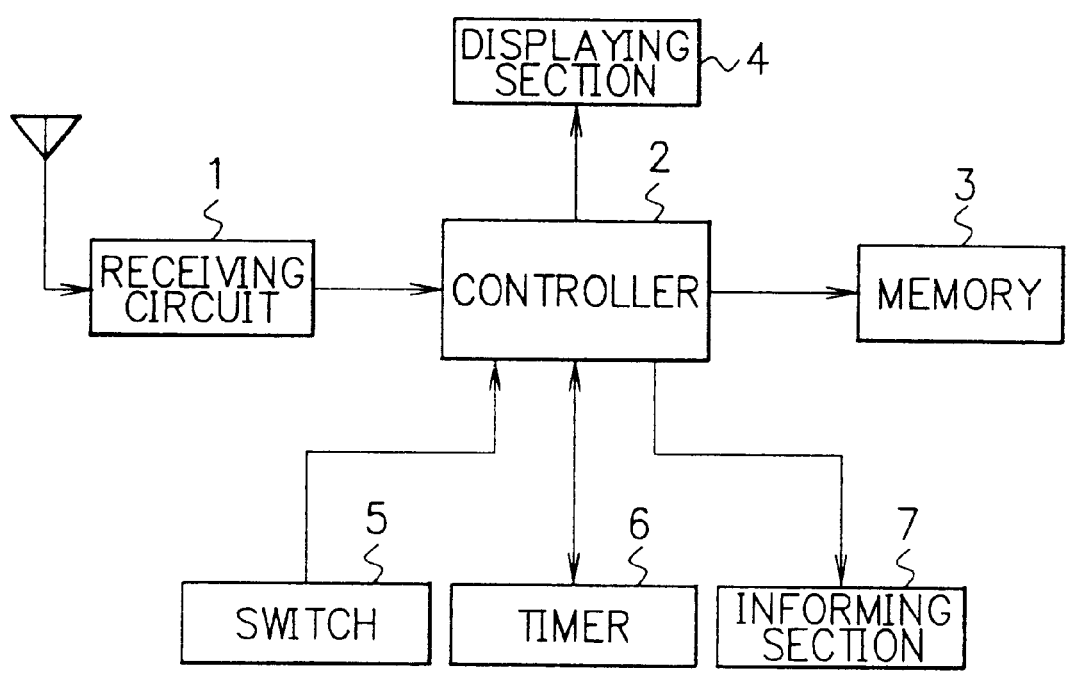
FIG. 1 is a block diagram showing an embodiment of a radio selective-calling receiver with a displaying function of the present invention.

Referring now to the drawings, embodiments of the present invention are explained in detail. Referring to FIGS.

1 to 21, a radio selective-calling receiver with a displaying function of the present invention is explained.

FIG. 1 is a block diagram showing an embodiment of a radio selective-calling receiver with a displaying function of the present invention. At the embodiment of the present invention shown in FIG. 1, the receiver is constituted of a receiving circuit 1, a controller 2 which is operated by programs, a memory 3 memorizing the received messages, a displaying section 4 which displays the received message, a switch 5, a timer 6 and an informing section 7.

The receiving circuit 1 takes out a message addressed to own receiver from radio signals by the known radio demodulating and decoding technology and outputs the message data to the controller 2.

FIG. 2 is a diagram showing the construction of the controller and the memory of a first embodiment of the present invention. As shown in FIG. 2, the controller 2 includes an informing confirmed distinguishing means A21, an informing display controlling means "1" A22, an unconfirmed message confirmed distinguishing means A23, a message output controlling means A24 and an informing output controlling means A25. The informing confirmed distinguishing means A21 distinguishes whether the message newly received and displayed on the displaying section 4 is confirmed by the confirming operation of the user or not. The unconfirmed message confirmed distinguishing means A23 distinguishes whether the unconfirmed message is confirmed by the confirming operation of the user or not. The informing display controlling means "1" A22 changes the displaying state of an unconfirmed symbol by the results of the informing confirmed distinguishing means A21 and the unconfirmed message confirmed distinguishing means A23. The informing output controlling means A25 switches the output methods at the time of informing the receiving messages and at the time of re-informing, corresponding to the output methods set by the user.

As shown in FIG. 2, the memory 2 includes the information of automatic informing stop memorizing section A31, a message memorizing section A32 and a setting of output of informing memorizing section A33. The message memorizing section A32 memorizes the received message and also memorizes the unconfirmed state, which is the distinguished result of every message by the unconfirmed message confirmed distinguishing means A23, expressing whether the confirming operation by the user is implemented or not. The information of automatic informing stop memorizing section A31 memorizes the distinguished result, which is the distinguished result by the informing confirmed distinguishing means A21, whether the confirming operation for the newly received message by the user is implemented or not. The setting of output of informing memorizing section A33 memorizes the setting information of the output method set by the user.

Figure 3:
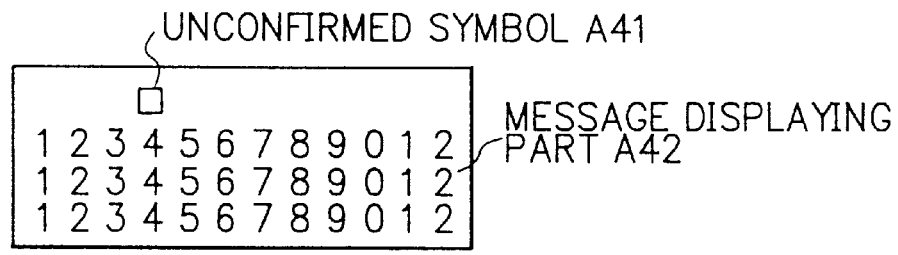
FIG. 3 is a diagram showing the construction of a displaying section of the first embodiment of the present invention.

FIG. 3 is a diagram showing the construction of the displaying section of the first embodiment of the present invention. As shown in FIG. 3, the displaying section 4 includes an unconfirmed symbol A41 and a message displaying part A42. The message is outputted on the message displaying part A42 by the control of the message output controlling means A24. The unconfirmed symbol A41 is turned on or flashed or turned off by the control of the informing display controlling means "1" A22.

In the switch 5, a switch using for the confirming operation by the user is provided. The switch is used for the confirmation, at the time when a new message is received, at the time when the message is re-displayed at the case that the message was once displayed but the confirming operation was not implemented by the user, and at the time when the message is read out.

The timer 6 counts the time as a basis of watching the operation whether the operation is intentionally implemented or not, at the time when a new message is received, at the time when the message is re-displayed at the case that the message was displayed on the displaying section 4 but the confirming operation was not implemented by the user, at the time when the message is read out, or at the time when the switch operation is implemented without the intention of the user, and counts the watching time of the switch operation in order to reduce the current consumption.

The informing section 7 includes an LED, a sounder, a vibrator and a display. However, at this embodiment, the informing method at the informing is set to display the information on the display, therefore the operation of the informing section 7 is omitted.

The radio selective-calling receiver with the displaying function of the first embodiment informs the user the calling by displaying the message on the display, at the case that the receiver is set by the user without using an LED or a sounder or a vibrator and with using only the display for informing the message. And this radio selective-calling receiver with the displaying function is the receiver with which the user can recognize that the message displaying on the display is the informing state at the time when the message is received. And this receiver is the receiver with which the user can recognize that the message displaying on the display is the informing state, at the case that the informing stop operation was not implemented at the receiving and the informing operation was automatically stopped, and after this, at the time when the re-informing is implemented by the reading out operation of the user. That is, the present invention provides the radio selective-calling receiver with the displaying function which clearly shows that the receiver is in the informing state at the time of the informing operation of receiving and the re-informing operation. And the receiver can be clearly recognized that the operation is not in the informing state at the time of the reading out operation of the confirmed messages.

In order to achieve this object in the above mentioned first embodiment of the present invention, the receiver displays the received message on the display at the time of calling and also makes the unconfirmed symbol A41 flash in order to show the message is unconfirmed. The confirming operation of message by the user is watched by the informing confirmed distinguishing means A21 and the unconfirmed message confirmed distinguishing means A23. At the case that the message is confirmed by the confirming operation by the user, the informing display controlling means "1" A22 switches the unconfirmed symbol A41 to turning on or turning off, based on the distinguished result of the informing confirmed distinguishing means A21 and the unconfirmed message confirmed distinguishing means A23. In this, the unconfirmed symbol A41 is turned on at the case that the unconfirmed messages exist and is turned off at the case that the unconfirmed message does not exist.

At the case that the message is not confirmed by the confirming operation by the user, the informing display controlling means "1" A22 switches the unconfirmed symbol A41 to turning on or turning off, based on the unconfirmed message confirmed distinguishing means A23. And the controller 2 sets the information of the automatic informing stop at the memorizing section of informing of automatic informing stop A31 in the memory 3, based on the distinguished result of the informing confirmed distinguishing means A21. As the message of unconfirmed state, the message is memorized at the message memorizing section A32 in the memory 3, based on the distinguished result by the unconfirmed message confirmed distinguishing means A23. With this, the unconfirmed message is displayed with the flashing state of the unconfirmed symbol A41 as a re-informing message.

Figure 4:
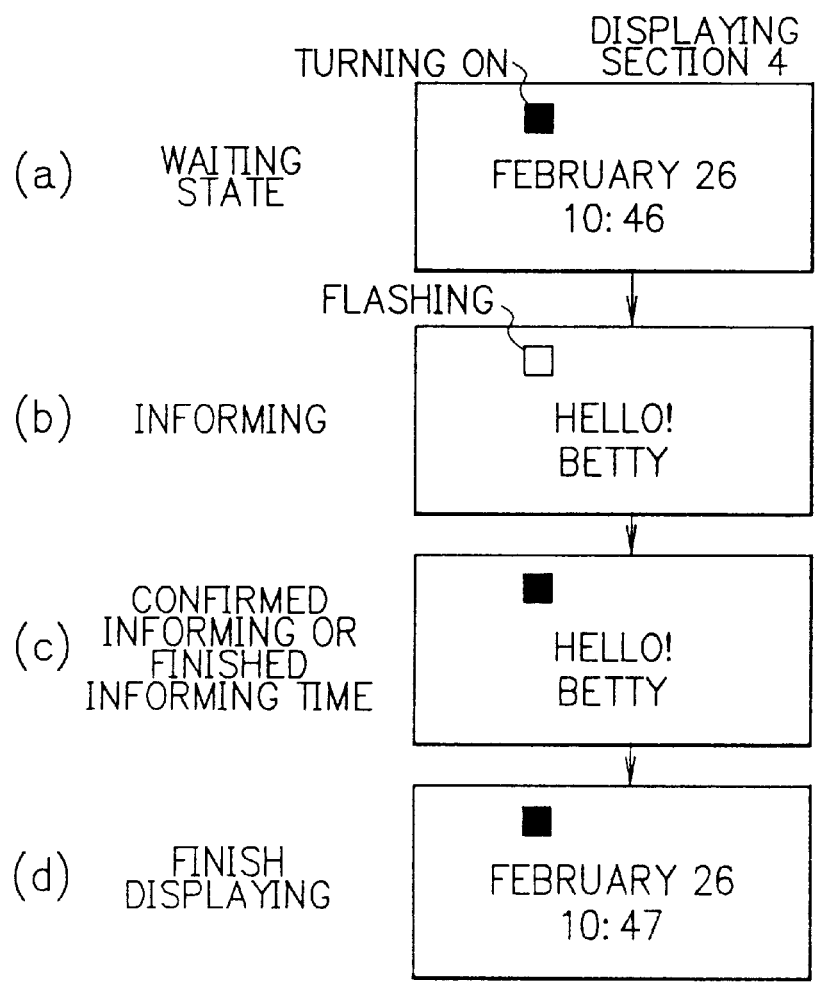
FIG. 4 is a displaying diagram showing a displaying example of the first embodiment of the present invention.

FIG. 4 is a displaying diagram showing a displaying example of the first embodiment of the present invention. Referring to FIG. 4, the display on the displaying section 4 at the time of informing the received message is explained. At the waiting state shown in FIG. 4(a), the unconfirmed symbol A41 of the radio selective-calling receiver with displaying function stays in turning on and it shows that unconfirmed message exists. At the time when a message is received, the contents of the received message is displayed and the unconfirmed symbol A41 flashes in order to make informing notice as shown in FIG. 4(b). At the case that the informing stop (confirmed operation of the message) is implemented by a switch operation or that the informing stop is not implemented even predetermined time passed by a switch operation, the unconfirmed symbol A41 is switched from flashing to turning on as shown in FIG. 4(c). At the time when the switch operation of the displaying finish is implemented, the message displaying is finished as shown in FIG. 4(d). At this time, at the case that the unconfirmed message exists, the unconfirmed symbol A41 stays in turning on and the operation changes to the waiting state.

The display of re-informing is explained in FIG. 4(b), at the case that the radio selective-calling receiver with the displaying function is at the waiting state, and the user did not confirm the message at the time when the message was received, the contents of the message are displayed and the unconfirmed symbol A41 is made to flash in order to make the user notice that the message is re-informing. At the case that the informing stop operation (confirmed operation of the message) is implemented by the switch operation or the re-informing stop operation is not implemented by the switch operation even after a predetermined time passes, the unconfirmed symbol A41 is switched from flashing to turning on as shown in FIG. 4(c). After this, the message displaying is finished by the switch operation of the displaying finish or by the time passed set in the timer 6, at the time when the unconfirmed messages exist, the unconfirmed symbol A41 stays in turning on and the displaying section 4 changes to the waiting state.

Figure 5:
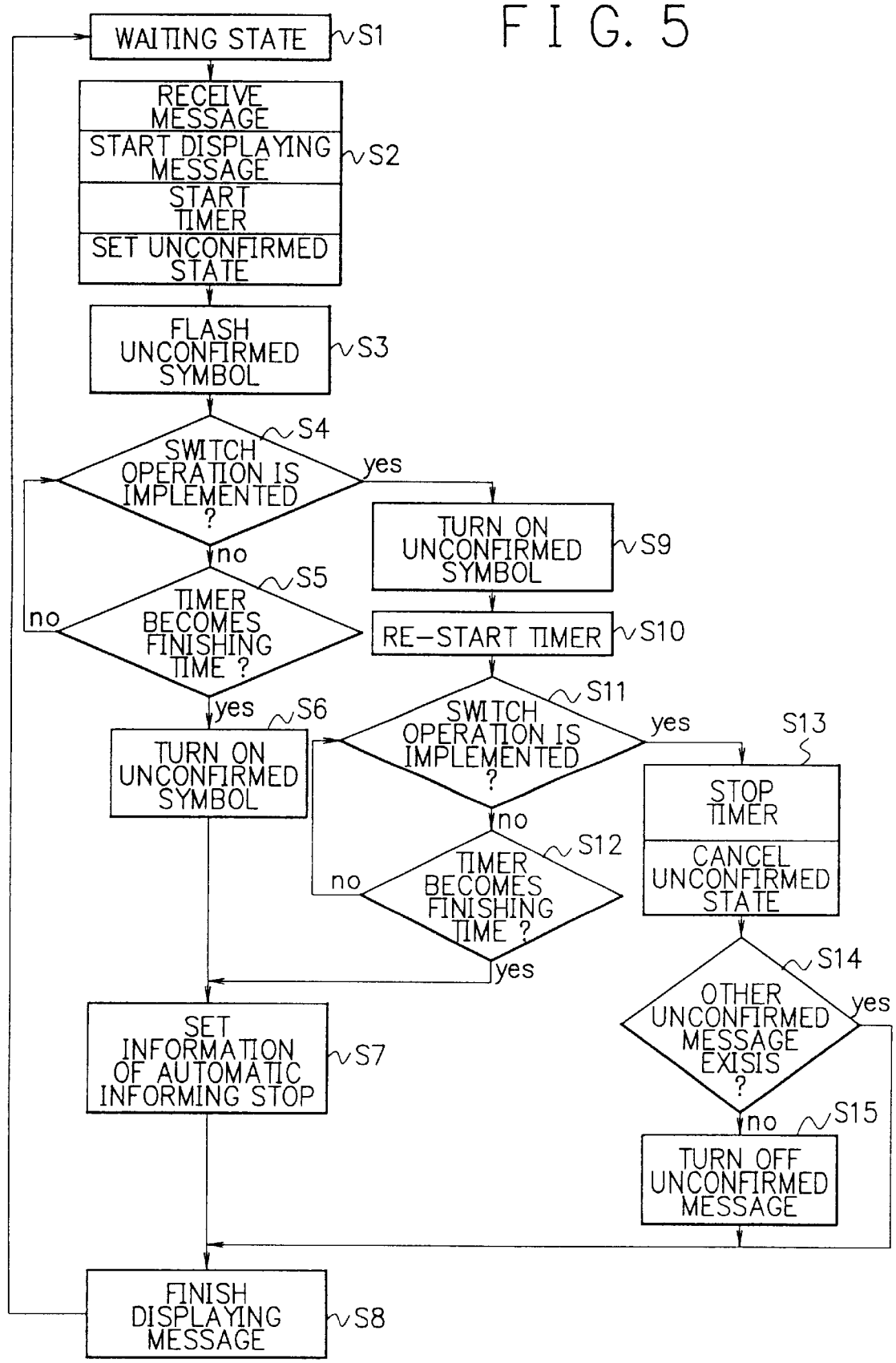
FIG. 5 is a flowchart showing the informing operation at the time when the message is received in the first embodiment of the present invention.

FIG. 5 is a flowchart showing the informing operation at the time when the message is received in the first embodiment of the present invention. Referring to FIG. 5, the operation is explained in detail. The operation is explained at the state that the informing operation is implemented only by the display set by the informing output controlling means A25, at the time when the message is received and the message is re-informed.

At the case that a message addressed to own receiver is received at a waiting state (step S1), the controller 2 makes the memory 3 memorize the message received by the receiving circuit 1. And at the same time the controller 2 makes the displaying section 4 display the contents of the message (start displaying message). And also at the same time, a timer 6 watching the switch 5 is started. At this time, an unconfirmed state is set for the received message.

The controller 2 makes the unconfirmed symbol A41 on the display flash as shown in FIG. 4(b), in order to show that this message is being informed (step S3). The switch operation by the user is watched until the timer 6 stops by the informing confirmed distinguishing means A21 and the unconfirmed message confirmed distinguishing means A23 (step S4). The switch operation is not implemented by the user (no of step S4) and the timer 6 becomes the finishing time (yes of step S5), and then the unconfirmed symbol A41 is turned on as shown in FIG. 4(c), this means that the finishing the informing state is shown by switching from flashing to turning on (step S6). After this, the controller 2 sets the information of the automatic informing stop to the information of automatic informing stop memorizing section A31 in the memory 3 (step S7), and the displaying message is finished (step S8) and the operation is returned to the waiting state (step S1).

At the step S4, the switch operation is implemented before the timer 6 becomes finishing time (yes of step S4), the unconfirmed symbol A41 is switched to turning on from flashing as shown in FIG. 4(c) (step S9). At this time, the controller 2 stops the timer 6 and makes the timer 6 re-start (step S10). The controller 2 watches the switch operation by the user until the timer 6 becomes the finishing time. And at the case that the switch operation is not implemented (no of step S11) and the timer 6 becomes the finishing time (yes of step S12), judging that the message confirming operation by the user is not implemented. And the controller 2 sets the information of the automatic informing stop to the information of automatic informing stop memorizing section A31 in the memory 3 (step S7), and the displaying message is finished (step S8).

At the step S11, at the case that the switch operation by the user is implemented (yes of step S11), the controller 2 stops the timer 6 and also cancels the unconfirmed state of the message (step S13). After this, the controller 2 retrieves the messages of the unconfirmed state from the message memorizing section A32 in the memory 3. At the case that the unconfirmed message does not exist (no of step S14), the controller 2 makes the unconfirmed symbol A41 turn off (step S15) and finishes displaying the message (step S8). At the case that the unconfirmed messages exists (yes of step S14), the controller 2 makes the unconfirmed symbol A41 stay in turning on and finishes displaying the message (step S8).

Figure 6:
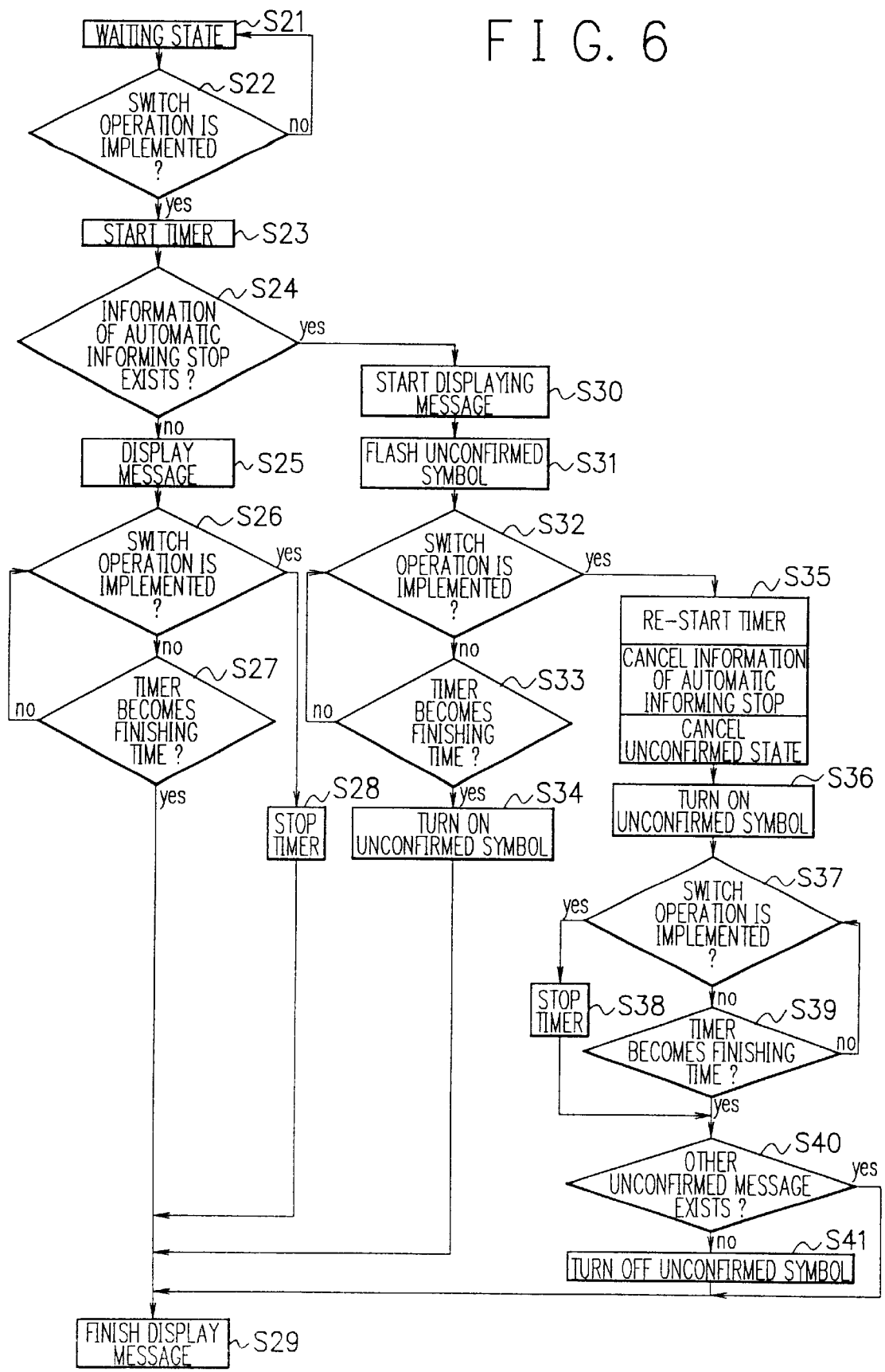
FIG. 6 is a flowchart showing the operation when the re-informing operation is implemented at the first embodiment.

FIG. 6 is a flowchart showing the operation when the re-informing operation is implemented at the first embodiment. Referring to FIG. 6, the re-informing operation is explained in detail. At the case that the message confirmation is implemented from the waiting state (step S21), the controller 2 watches the switch operation, and at the case that the switch operation is implemented (yes of step S22), the controller 2 makes the timer 6 start (step S23). The controller 2 distinguishes whether the information of automatic informing stop exists or not at the memory 3. At the case that the information of automatic informing stop does not exist (no of step S24), the controller 2 takes out the message from the message memorizing section A32 and displays the confirmed re-reading message (step S25). After this, the controller 2 watches the switch 5 until the switch operation is implemented during the time that the timer 6 works. The switch operation is not implemented (no of step S26) and the timer 6 becomes the finishing time (yes of step S27), and then the controller 2 finishes displaying the message (step S29).

At the step S26, at the case that the switch operation is implemented (yes of step S26), the timer 6 is stopped (step S28) and the operation corresponding to the switch operation is implemented. After this, the operation becomes the waiting state, and the receiving or the switch operation is waited.

At the step S24, at the case that the controller 2 distinguishes that the information of automatic informing stop exists, the controller 2 starts the displaying the latest received unconfirmed message (step S30). At the same time, the unconfirmed symbol A41 is made to flash in order to show that the message is being re-informed (step S31). After this, the controller 2 watches the switch 5 until the switch operation is implemented during the time that the timer 6 works. The switch operation is not implemented (no of step S32) and the timer 6 becomes the finishing time (yes of step S33). And then the controller 2 judges that the confirming operation by the user is not implemented and makes the unconfirmed symbol A41 switch from flashing to turning on (step S34).

At the step S32, at the case that the switch operation is implemented (yes of step S32), the timer 6 is stopped and is made to re-start. At the same time, the information of automatic informing stop is canceled and the unconfirmed state of the message being outputting is cancelled (step S35). After this, the controller 2 makes the unconfirmed symbol A41 switch from flashing to turning on (step S36). And the controller 2 watches the switch 5 until the switch operation is implemented during the time that the timer 6 works (step S37).

At the case that the switch operation is not implemented (no of step S37) and the timer 6 becomes finishing time (yes of step S39), the controller 2 retrieves the messages of unconfirmed state from the message memorizing section A32 (step S40). At the case that the unconfirmed messages do not exist (no of step S40), the unconfirmed symbol A41 is made to turn off (step S41).

At the step S37, at the case that the switch operation is implemented (yes of step S37), the timer 6 is made to stop (step S38), the controller 2 retrieves the messages of unconfirmed state from the message memorizing section A32 (step S40). At the case that the unconfirmed messages exist (yes of step S40), the unconfirmed symbol A41 is made to stay in turning on and the operation goes to the step S29.

As mentioned above, in the first embodiment of the present invention, at the time of receiving, the received message is displayed on the display and also the unconfirmed symbol A41 is made to flash in order to show that the message is unconfirmed. And the confirming operation by the user is watched by the informing confirmed distinguishing means and the unconfirmed message confirmed distinguishing means. And at the case that the confirming operation by the user is not implemented the information of automatic informing stop is set at the information of automatic informing stop memorizing section in the memory, based on the distinguished result of the informing confirmed distinguishing means. And the message is also memorized at the message memorizing section in the memory, as the information having an unconfirmed state, based on the distinguished result of the unconfirmed message confirmed distinguishing means. With this, the unconfirmed symbol at the displaying section is made to flash, as the message is re-informing message.

Therefore, at the state setting both the sound and the vibration do not work, the message on the display is easily distinguished whether the message is the newly received message or the message has been confirmed and is displayed for re-reading.

And the judgement of the message displayed at the reading out operation becomes easy, at the judgement whether the message is re-displaying message that the message has been once displayed but has not been confirmed by the user or the message has been already confirmed. Therefore, the occurrence of the problem that the message has been actually confirmed by the user but has been stored in the memory as the unconfirmed message can be prevented.

Figure 8:
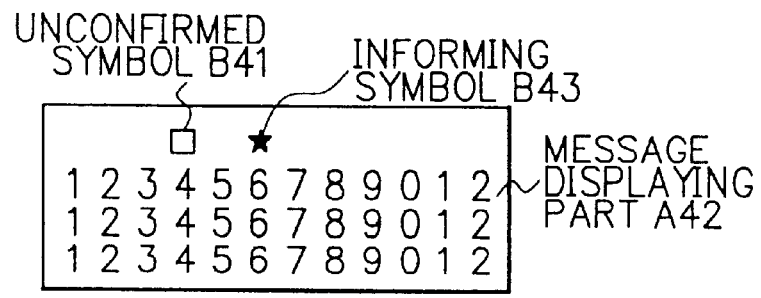
FIG. 8 is a diagram showing the construction of a displaying section of the second embodiment of the present invention.

Next, a second embodiment of the present invention is explained in detail. FIG. 7 is a diagram showing the construction of the controller and the memory of the second embodiment of the present invention. FIG. 8 is a diagram showing the construction of the displaying section of the second embodiment of the present invention.

Referring to FIGS. 7 and 8, the second embodiment of the present invention is explained in detail. The structural elements of the controller and the displaying section of the second embodiment are different from those of the first embodiment. As shown in FIG. 7, a informing display controlling means "2" B22 instead of the informing display controlling means "1" A22 is provided at the controller 2 in the second embodiment. Further an unconfirmed display controlling means B26 is provided at the controller 2. At the displaying section 4, an unconfirmed symbol B41 whose displaying operation is different from the first embodiment and an informing symbol B43 newly furnished are provided.

The informing display controlling means "2" B22 makes the informing symbol B43 turn on or turn off or flash, based on the result of the informing confirmed distinguishing means A21. The unconfirmed display controlling means B26 makes the unconfirmed symbol B41 turn on or turn off or flash, based on the result of the unconfirmed message confirmed distinguishing means A23.

The same as the first embodiment, the object of the second embodiment is to provide the clear distinguishing functions that the informing state is shown at the time when a message is received and the message is re-informed for the confirmation, and the informing state is stopped at the reading out operation of the confirmed message.

In order to achieve this object, at the second embodiment, at the time when a message is received, the message is displayed on the displaying section 4 and the informing symbol B43 is also made to turn on in order to show that the message is unconfirmed. And the confirming operation of the message by the user is watched by the informing confirmed distinguishing means A21 and the unconfirmed message confirmed distinguishing means A23. At the case that the confirming operation of the message by the user is implemented, the informing display controlling means "2" B22 makes the informing symbol B43 turn off, based on the distinguished result of the informing confirmed distinguishing means A21.

At the case that the confirming operation of the message by the user is not implemented, the informing output controlling means A25 makes the informing symbol B43 turn off, based on the distinguished result of the informing confirmed distinguishing means A21. And the controller 2 makes the information of automatic informing stop set at the information of automatic informing stop memorizing section A31 in the memory 3. Further, the message is memorized at the message memorizing section A32 in the memory 3 as the message of the unconfirmed state, based on the distinguished result of the unconfirmed message confirmed distinguishing means A23. With this, the unconfirmed message is displayed at the state that the informing symbol B43 stays in turning on as the re-informing message.

Figure 9:
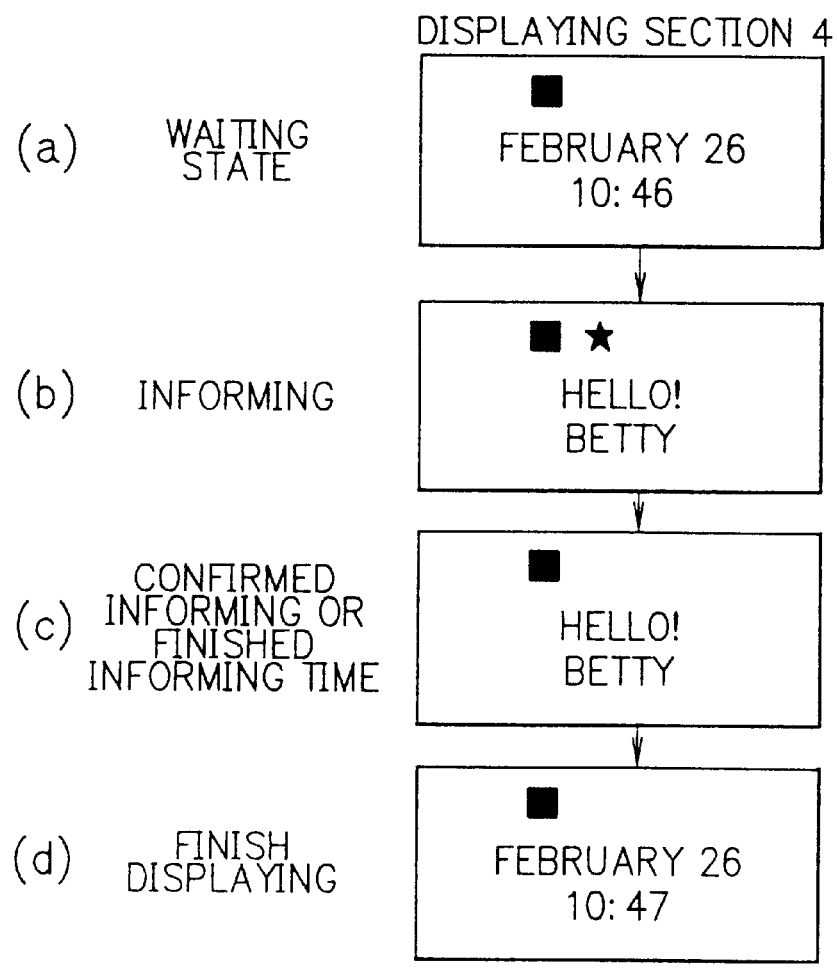
FIG. 9 is a displaying diagram showing a displaying example of the second embodiment of the present invention.

FIG. 9 is a displaying diagram showing a displaying example of the second embodiment of the present invention. Referring to FIG. 9, the display on the displaying section 4 at the time when a message is received is explained. At the waiting state shown in FIG. 9(a), the unconfirmed symbol B41 of the radio selective-calling receiver with the displaying function stays in turning on and it shows that unconfirmed message exists. At the time when a message is received, the contents of the received message is displayed and the informing symbol B43 is made to flash in order to make informing notice as shown in FIG. 9(b). At the case that the informing stop (confirmed operation of the message) is not implemented by a switch operation and the informing stop is not implemented within the predetermined time by a switch operation, the informing symbol B43 is turned off as shown in FIG. 9(c). Further, at the time when the switch operation of the displaying finish is implemented, the message displaying is finished as shown in FIG. 9(d). At this time, at the case that the unconfirmed message exists, the unconfirmed symbol B41 stays in turning on and the operation changes to the waiting state.

The display of re-informing is explained. At the case that the radio selective-calling receiver with the displaying function is at the waiting state, and the user did not confirm the message at the time when the message was received (the information of automatic informing stop exists), the contents of the message are displayed and the informing symbol B43 is made to turn on in order to make the user notice that the message is re-informing as shown in FIG. 9(b). At the case that the informing stop operation (confirmed operation of the message) is implemented by the switch operation or the informing stop operation is not implemented by the switch operation within the predetermined time, the informing symbol B43 is made to turn off as shown in FIG. 9(c). Further, the displaying finish operation by the switch operation is implemented or the predetermined time of the timer 6 has passed, then the displaying of the message is finished. At the time when the unconfirmed messages exist, the unconfirmed symbol B41 stays in turning on and the displaying section 4 changes to the waiting state. It is applicable that the informing symbol B43 is made to flash at the message is being informed and is made to turn on after the informing of the message is finished.

FIG. 10 is a flowchart showing the informing operation at the time when the message is received in the second embodiment of the present invention. Referring to FIG. 10, the informing operation is explained in detail. The operation is explained at the state that the informing operation is implemented only by the display set by the informing output controlling means A25 at the time when the message is received and the message is re-informed.

At the case that a message addressed to own receiver is received at a waiting state (step S51), the receiving circuit 1 takes out the demodulated signals from the received radio signals addressed to own receiver and outputs the signals to the controller 2. The controller 2 makes the memory 3 memorize the message from the outputted demodulated signals. And at the same time the controller 2 makes the displaying section 4 display the contents of the message (start displaying message). And also at the same time, a timer 6 watching the switch 5 is started. At this time, an unconfirmed state is set for the received message (step S52).

The controller 2 examines whether the unconfirmed symbol B41 stays in turning on or not (step S53), at the case that the unconfirmed symbol B41 does not stay in turning on (no of step S53), the unconfirmed symbol B41 is made to turn on (step S54). After this, the informing symbol B43 showing that the received message is in an informing state is made to turn on (step S55). At the case that the unconfirmed symbol B41 stays in turning on (yes of step S53), the informing symbol B43 is made to turn on (step S55). FIG. 9(b) shows the state that the unconfirmed symbol B41 and the informing symbol B43 turn on.

The controller 2 watches the switch operation by the user until the timer 6 becomes the finishing time, at the case that the switch operation is not implemented (no of step S56) and the timer 6 becomes the finishing time (yes of step S57), the informing symbol B43 is turned off as shown in FIG. 9(c), this means the informing state is finished (step S58). After this, the controller 2 sets the information of the automatic informing stop to the information of automatic informing stop memorizing section A31 in the memory 3 (step S59), and the displaying message is finished (step S60) and the operation is returned to the waiting state (step S51).

At the step S56, at the case that the switch operation is implemented before the timer 6 becomes finishing time (yes of step S56), the informing symbol B43 is turned off as shown in FIG. 9(c) (step S61). At this time, the controller 2 stops the timer 6 and makes the timer 6 re-start (step S62) and watches the switch operation by the user until the timer 6 becomes the finishing time (step S63). And at the case that the switch operation is not implemented until the timer 6 becomes the finishing time (no of step S63 and yes of step S64), judging that the message confirming operation by the user is not implemented. And the controller 2 sets the information of the automatic informing stop to the information of automatic informing stop memorizing section A31 in the memory 3 (step S59), and the displaying message is finished (step S60).

At the step S63, at the case that the switch operation by the user is implemented (yes of step S63), the controller 2 stops the timer 6 and also cancels the unconfirmed state of the message (step S65). After this, the controller 2 retrieves the messages of the unconfirmed state from the message memorizing section A32 in the memory 3. At the case that the unconfirmed message does not exist (no of step S66), the controller 2 makes the unconfirmed symbol B41 turn off (step S67) and finishes displaying the message (step S60). At the case that the unconfirmed messages exists (yes of step S66), the controller 2 makes the unconfirmed symbol B41 stay in turning on and finishes displaying the message (step S60).

Figure 11:
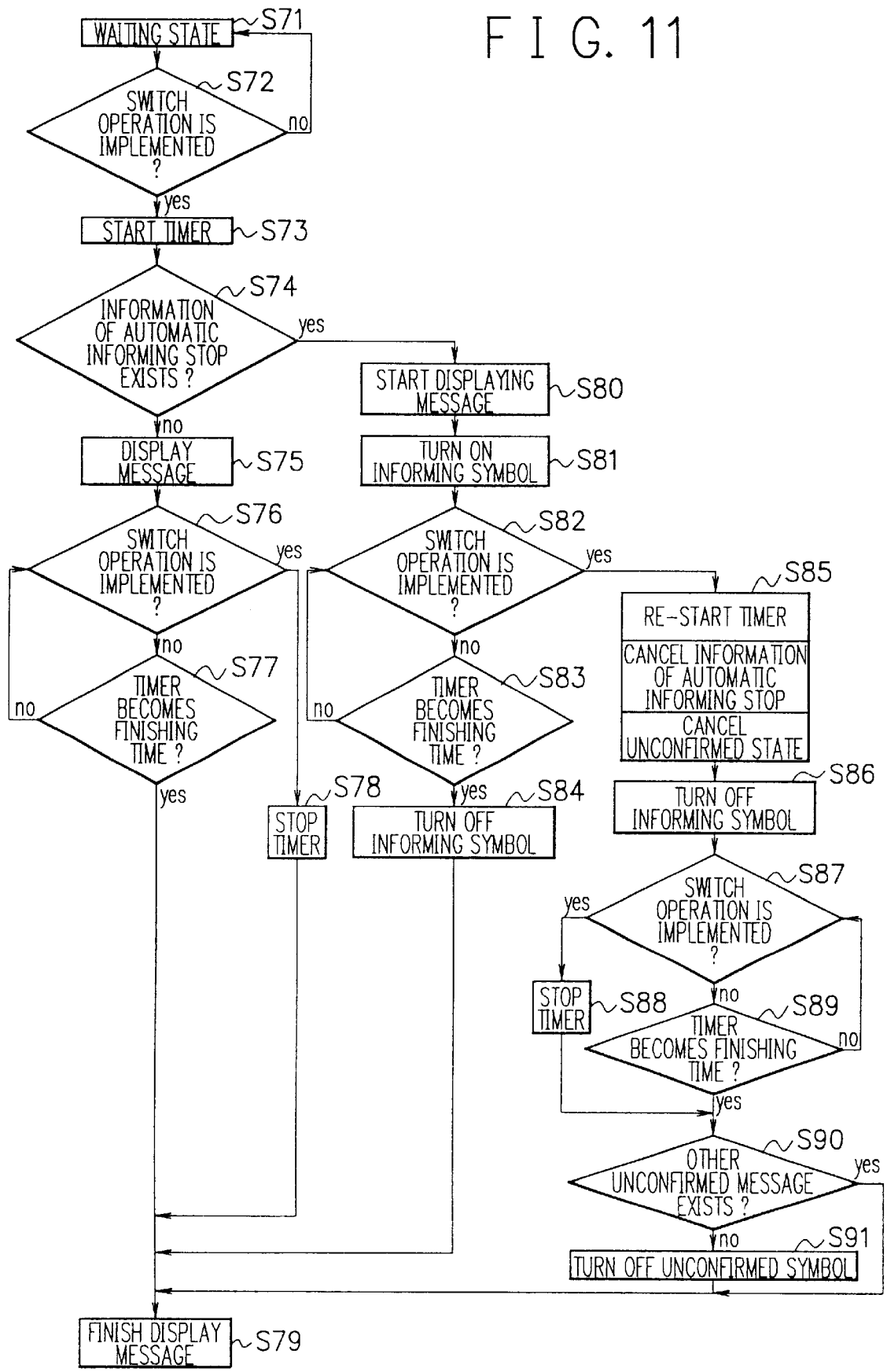
FIG. 11 is a flowchart showing the operation when the re-informing operation is implemented at the second embodiment.

FIG. 11 is a flowchart showing the operation when the re-informing operation is implemented at the second embodiment. Referring to FIG. 11, the re-informing operation is explained in detail. At the case that the message confirmation is implemented from the waiting state (step S71), the controller 2 watches the switch operation, and at the case that the switch operation is implemented (yes of step S72), the controller 2 makes the timer 6 start (step S73). The controller 2 distinguishes whether the information of automatic informing stop is set or not at memory 3. At the case that the information of automatic informing stop does not exist (no of step S74), the controller 2 takes out the message from the message memorizing section A32 and displays the confirmed re-reading message (step S75). After this, the controller 2 watches the switch 5 until the switch operation is implemented during the time that the timer 6 works. The switch operation is not implemented (no of step S76) and the timer 6 becomes the finishing time (yes of step S77), and then the controller 2 finishes displaying the message (step S79).

At the step S76, at the case that the switch operation is implemented (yes of step S76), the timer 6 is stopped (step S78) and the operation corresponding to the switch operation is implemented. After this, the operation becomes the waiting state, and the receiving or the switch operation is waited.

At the step S74, at the case that the controller 2 distinguishes that the information of automatic informing stop exists (yes of step S74), the controller 2 starts the displaying the latest received unconfirmed message (step S80). At the same time, the informing symbol B43 is made to turn on in order to show that the message is being re-informed (step S81). After this, the controller 2 watches the switch 5 until the switch operation is implemented during the time that the timer 6 works. The switch operation is not implemented (no of step S82) and the timer 6 becomes the finishing time (yes of step S83). And then the controller 2 judges that the confirming operation by the user is not implemented and makes the informing symbol B43 turn off (step S84).

At the step S82, at the case that the switch operation is implemented (yes of step S82), the timer 6 is stopped and is made to re-start. At the same time, the information of automatic informing stop is canceled and the unconfirmed state of the messages being outputting is cancelled (step S85). After this, the controller 2 judges that the informing stop operation is implemented by the switch operation and makes the informing symbol B43 turn off (step S86). And the controller 2 watches the switch 5 until the switch operation is implemented during the time that the timer 6 works (step S87).

At the case that the switch operation is not implemented (no of step S87) and the timer 6 becomes finishing time (yes of step S89), the controller 2 retrieves the messages of unconfirmed state from the message memorizing section A32 (step S90). At the case that the unconfirmed messages do not exist (no of step S90), the unconfirmed symbol B41 is made to turn off (step S91).

At the step S87, at the case that the switch operation is implemented (yes of step S87), the timer 6 is made to stop (step S88), the controller 2 retrieves the messages of unconfirmed state from the message memorizing section A32 (step S90). At the case that the unconfirmed messages exist (yes of step S90), the unconfirmed symbol B41 is made to stay in turning on and the operation goes to the step S79. It is applicable that the informing symbol B43 is made to flash at the informing operation and is made to turn on at the time when the informing operation is not implemented. For the unconfirmed symbol B41, the same operation is applicable.

As mentioned above, in the second embodiment of the present invention, at the time of receiving, the received message is displayed on the display and also the informing symbol B43 is made to turn on in order to show that the message is unconfirmed. And the confirming operation by the user is watched by the informing confirmed distinguishing means and the unconfirmed message confirmed distinguishing means. And at the case that the confirming operation by the user is not implemented, the information of automatic informing stop is set at the information of automatic informing stop memorizing section in the memory, based on the distinguished result of the informing confirmed distinguishing means. And the message is also memorized at the message memorizing section in the memory, as the information having an unconfirmed state, based on the distinguished result of the unconfirmed message confirmed distinguishing means. With this, the informing symbol at the displaying section is made to turn on, as the message is re-informing.

Therefore, at the state setting both the sound and the vibration do not work, the message on the display is easily distinguished whether the message is the newly received message or the message has been confirmed and is displayed for re-reading.

And the judgement of the message displayed at the reading out operation becomes easy, at the judgement whether the message is re-displaying message that the message has been once displayed but has not been confirmed by the user or the message has been already confirmed. Therefore, the occurrence of the problem that the message has been actually confirmed by the user but has been stored in the memory as the unconfirmed message can be prevented.

Next, a third embodiment of the present invention is explained in detail. FIG. 12 is a diagram showing the construction of the controller and the memory of the third embodiment of the present invention. FIG. 13 is a diagram showing the construction of the displaying section of the third embodiment of the present invention.

Referring to FIGS. 12 and 13, the third embodiment of the present invention is explained in detail. The structural elements of the controller and the displaying section of the third embodiment are different from those of the first and second embodiments. As shown in FIG. 12, in the controller 2 of the third embodiment, the informing display controlling means furnished at the first and second embodiments is not provided, a background picture display controlling means C27 is provided. Further the informing symbol at the second embodiment is not provided, a background picture displaying part C44 is newly provided at the third embodiment.

The background picture display controlling means C27 distinguishes the setting of the background picture by the user and also displays "informing" on the background picture displaying part C44 at the time of informing, by the result of the informing confirmed distinguishing means A21. The background picture is displayed on the background picture displaying part C44 by the background picture display controlling means C27. The unconfirmed symbol B41 works as the same as the second embodiment by the control of the unconfirmed display controlling means B26.

The same as the first and second embodiments, the object of the third embodiment is to provide the clear distinguishing functions that the informing state is shown at the time when a message is received and the message is re-informed for the confirmation, and the informing state is stopped at the reading out operation of the confirmed message.

In order to achieve this object, at the third embodiment, at the time when a message is received, the message is displayed on the displaying section 4 and the background picture is also switched to "informing" in order to show that the message is unconfirmed. And the confirming operation of the message by the user is watched by the informing confirmed distinguishing means A21 and the unconfirmed message- confirmed distinguishing means A23. At the case that the confirming operation of the message by the user is implemented, the background picture display controlling means C27 makes the background picture return to the original, based on the distinguished result of the informing confirmed distinguishing means A21.

At the case that the confirming operation of the message by the user is not implemented, the background picture display controlling means C27 makes the background picture return to the original, based on the distinguished result of the informing confirmed distinguishing means A21. And the controller 2 makes the information of automatic informing stop set at the information of automatic informing stop memorizing section A31 in the memory 3. Further, the message is memorized at the message memorizing section A32 in the memory 3 as the message of the unconfirmed state, based on the distinguished result of the unconfirmed message confirmed distinguishing means A23. With this, the unconfirmed message is displayed at the state that the background picture is switched to "informing" as the re-informing message.

FIG. 14 is a displaying diagram showing a displaying example of the third embodiment of the present invention. Referring to FIG. 14, the display on the displaying section 4 at the time when a message is received is explained. At the waiting state shown in FIG. 14(a), the unconfirmed symbol B41 of the radio selective-calling receiver with the displaying function stays in turning on and it shows that unconfirmed message exists. At the time when a message is received, the contents of the received message is displayed and the background picture is made to switch "informing" in order to make informing notice as shown in FIG. 14(b). At the case that the informing stop (confirmed operation of the message) is implemented by a switch operation or the informing stop is not implemented within the predetermined time by a switch operation, the "informing" is switched to the background picture as shown in FIG. 14(c). Further, at the time when the switch operation of the displaying finish is implemented, the message displaying is finished as shown in FIG. 14(d). At this time, at the case that the unconfirmed message exists, the unconfirmed symbol B41 stays in turning on and the operation changes to the waiting state.

The display of re-informing is explained. At the case that the radio selective-calling receiver with the displaying function is at the waiting state, and the user did not confirm the message at the time when the message was received (the information of automatic informing stop exists), the contents of the message are displayed and the background picture is switched to "informing" in order to make the user notice that the message is re-informing as shown in FIG. 14(b). At the case that the informing stop operation (confirmed operation of the message) is implemented by the switch operation or the informing stop operation is not implemented by the switch operation within the predetermined time, the "informing" is switched to the background picture as shown in FIG. 14(c). Further, the displaying finish operation by the switch operation is implemented or the predetermined time of the timer 6 has passed, then the displaying of the message is finished. At the time when the unconfirmed messages exist, the unconfirmed symbol B41 stays in turning on and the displaying section 4 changes to the waiting state. As another application of the third embodiment, it is applicable that the background picture is not made to switch and the original picture is made to flash, in order to show the informing operation.

Figure 15:
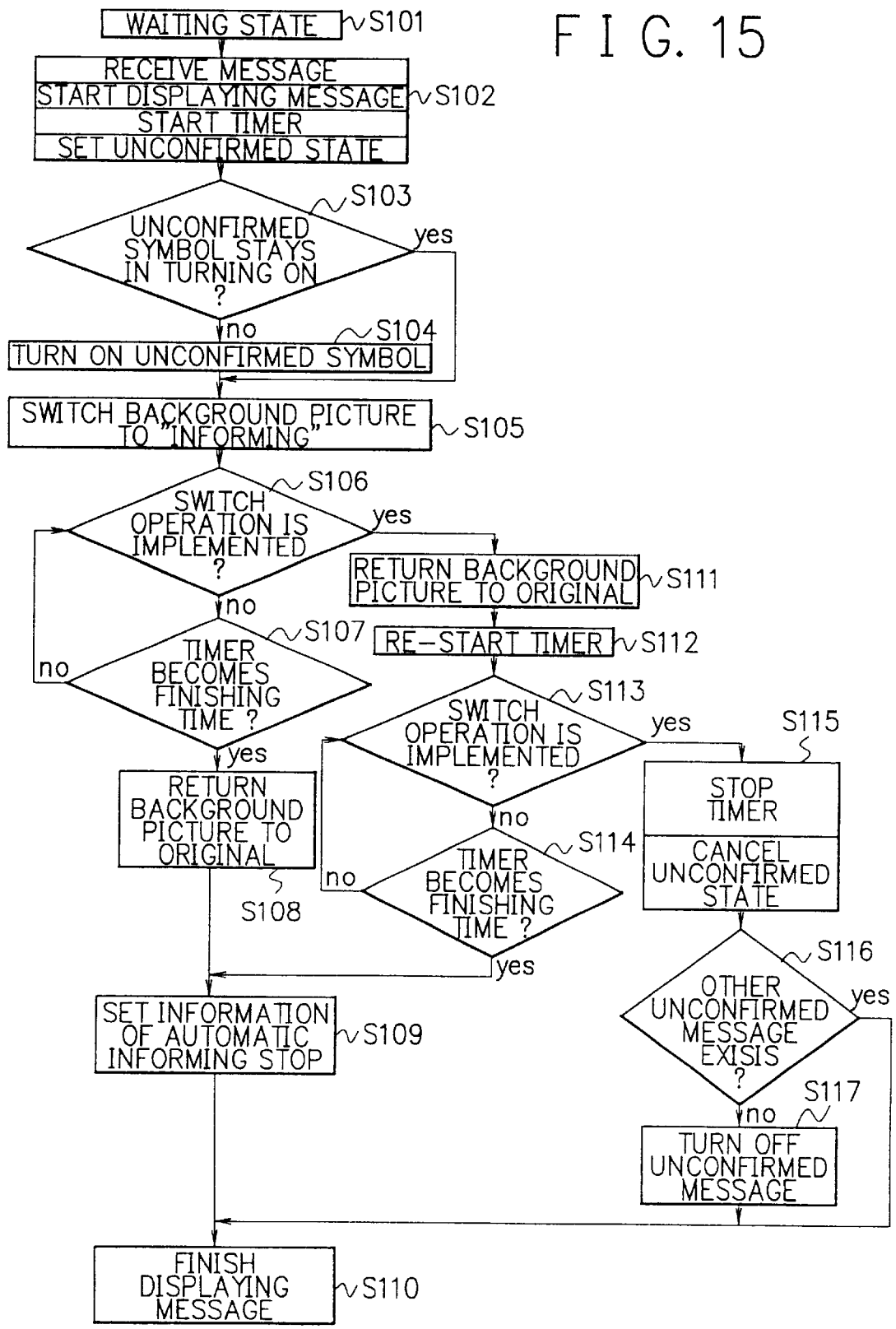
FIG. 15 is a flowchart showing the informing operation at the time when the message is received in the third embodiment of the present invention.

FIG. 15 is a flowchart showing the informing operation at the time when the message is received in the third embodiment of the present invention. Referring to FIG. 15, the informing operation is explained in detail. The operation is explained at the state that the informing operation is implemented only by the display set by the informing output controlling means A25 at the time when the message is received and the message is re-informed. At the case that a message addressed to own receiver is received at a waiting state (step S101), the receiving circuit 1 takes out the demodulated signals from the received radio signals addressed to own receiver and outputs the signals to the controller 2. The controller 2 makes the memory 3 memorize the message from the outputted demodulated signals. And at the same time the controller 2 makes the displaying section 4 display the contents of the message (start displaying message). And also at the same time, a timer 6 watching the switch 5 is started. At this time, an unconfirmed state is set for the received message (step S102).

The controller 2 examines whether the unconfirmed symbol B41 stays in turning on or not (step S103), at the case that the unconfirmed symbol B41 does not stay in turning on (no of step S103), the unconfirmed symbol B41 is made to turn on (step S104). After this, the background picture is switched to "informing" in order to show that the received message is in an informing state (step S105). And the controller 2 watches the switch operation by the user until the timer 6 becomes the finishing time (step S106). At the case that the switch operation is not implemented (no of step S106) and the timer becomes the finishing time (yes of step S107), the background picture is switched from "informing" to the original picture, this means that the informing operation is finished (step S108). After this, the controller 2 sets the information of automatic informing stop in the memory 3 (step S109) and the displaying message is stopped (step S110) and the operation is returned to the waiting state (step S101).

At the step S106, at the case that the switch operation is implemented before the timer 6 becomes finishing time (yes of step S106), the controller 2 makes the background picture displaying part C44 return "informing" to the original picture (step S111). At this time, the controller 2 stops the timer 6 and makes the timer 6 re-start (step S112). And the controller 2 watches the switch operation by the user until the timer 6 becomes the finishing time (step S113). And at the case that the switch operation is not implemented until the timer 6 becomes the finishing time (no of step S113 and yes of step S114), judging that the message confirming operation by the user is not implemented. And the controller 2 sets the information of the automatic informing stop in the memory 3 (step S109), and the displaying message is finished (step S110).

At the step S113, at the case that the switch operation by the user is implemented (yes of step S113), the controller 2 stops the timer 6 and also cancels the unconfirmed state of the message (step S115). After this, the controller 2 retrieves the messages of the unconfirmed state from the message memorizing section A32 in the memory 3. At the case that the unconfirmed message does not exist (no of step S116), the controller 2 makes the unconfirmed symbol B41 turn off (step S117) and finishes displaying the message (step S110). At the case that the unconfirmed messages exists (yes of step S116), the controller 2 makes the unconfirmed symbol B41 stay in turning on and finishes displaying the message (step S110).

Figure 16:
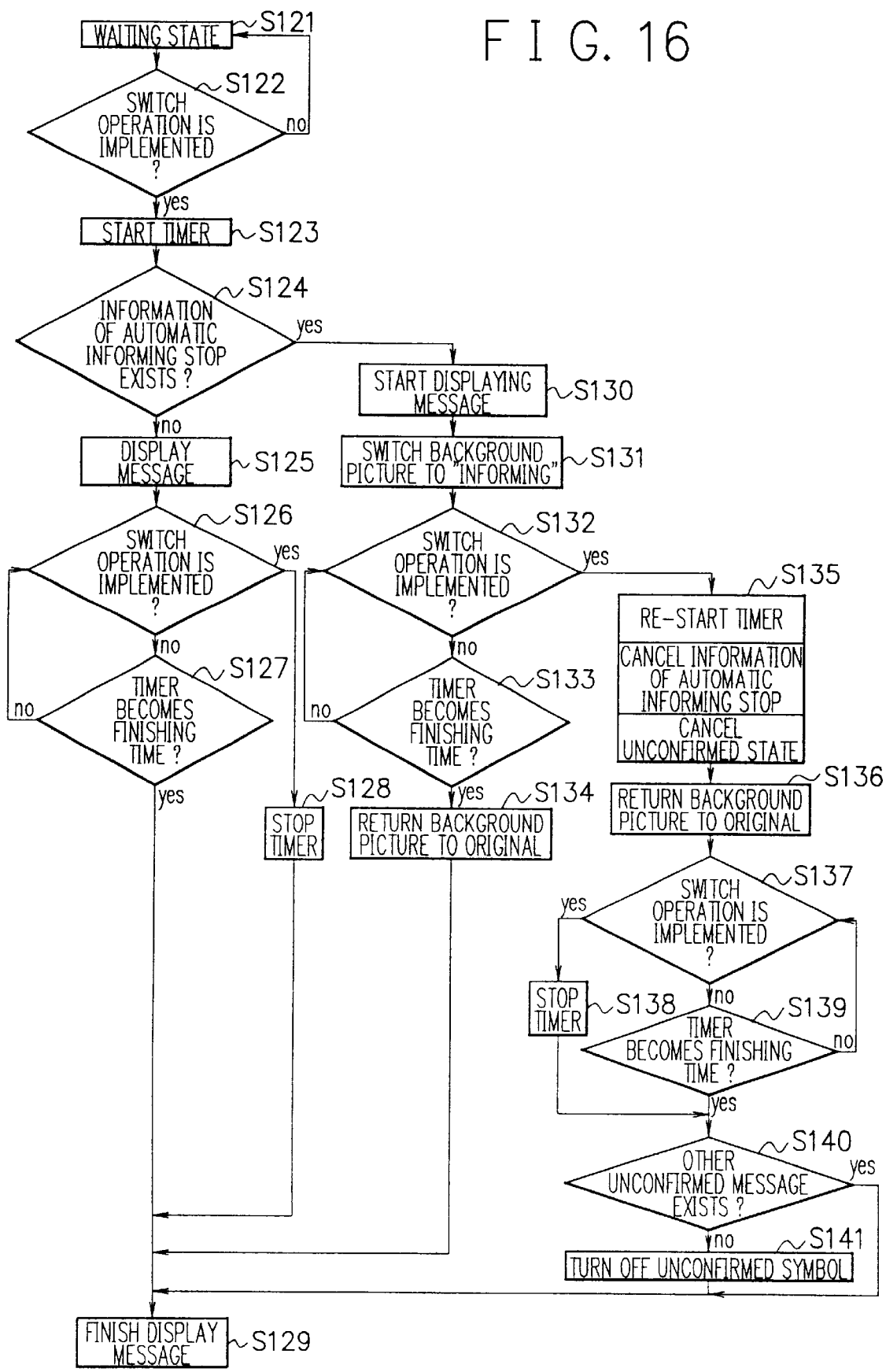
FIG. 16 is a flowchart showing the operation when the re-informing operation is implemented at the third embodiment.

FIG. 16 is a flowchart showing the operation when the re-informing operation is implemented at the third embodiment. Referring to FIG. 16, the re-informing operation is explained in detail. At the case that the message confirmation is implemented from the waiting state (step S121), the controller 2 watches the switch operation, and at the case that the switch operation is implemented (yes of step S122), the controller 2 makes the timer 6 start (step S123). The controller 2 distinguishes whether the information of automatic informing stop is set or not at the memory 3. At the case that the information of automatic informing stop does not exist (no of step S124), the controller 2 takes out the message from the message memorizing section A32 and displays the confirmed rereading message (step S125). After this, the controller 2 watches the switch 5 until the switch operation is implemented during the time that the timer 6 works. The switch operation is not implemented (no of step S126) and the timer 6 becomes the finishing time (yes of step S127), and then the controller 2 finishes displaying the message (step S129).

At the step S126, at the case that the switch operation is implemented (yes of step S126), the timer 6 is stopped (step S128) and the operation corresponding to the switch operation is implemented. After this, the operation becomes the waiting state, and the receiving or the switch operation is waited.

At the step S124, at the case that the controller 2 distinguishes that the information of automatic informing stop exists (yes of step S124), the controller 2 starts the displaying the latest received unconfirmed message (step S130). At the same time, the background picture is switched to "informing" in order to show that the message is being re-informed (step S131). After this, the controller 2 watches the switch 5 until the switch operation is implemented during the time that the timer 6 works. The switch operation is not implemented (no of step S132) and the timer 6 becomes the finishing time (yes of step S133). And then the controller 2 judges that the confirming operation by the user is not implemented and makes the background picture return to the original picture from "informing" (step S134).

At the step S132, at the case that the switch operation is implemented (yes of step S132), the timer 6 is stopped and is made to re-start. At the same time, the information of automatic informing stop is canceled and the unconfirmed state of the messages being outputting is canceled (step S135). After this, the controller 2 judges that the informing stop operation is implemented by the switch operation and makes the background picture return to the original picture from "informing" (step S136). And the controller 2 watches the switch 5 until the switch operation is implemented during the time that the timer 6 works (step S137).

At the case that the switch operation is not implemented (no of step S137) and the timer 6 becomes finishing time (yes of step S139), the controller 2 retrieves the messages of unconfirmed state from the message memorizing section A32 (step S140). At the case that the unconfirmed messages do not exist (no of step S140), the unconfirmed symbol B41 is made to turn off (step S141).

At the step S137, at the case that the switch operation is implemented (yes of step S137), the timer 6 is made to stop (step S138), the controller 2 retrieves the messages of unconfirmed state from the message memorizing section A32 (step S140). At the case that the unconfirmed messages exist (yes of step S140), the unconfirmed symbol B41 is made to stay in turning on and the displaying message is finished (step S129).

As mentioned above, in the third embodiment of the present invention, at the time of receiving, the received message is displayed on the display and also the background picture is switched from the original picture to "informing" in order to show that the message is unconfirmed. And the confirming operation of the message by the user is watched by the informing confirmed distinguishing means and the unconfirmed message confirmed distinguishing means. And at the case that the confirming operation of the message by the user is not implemented, the information of automatic informing stop is set at the information of automatic informing stop memorizing section in the memory, based on the distinguished result of the informing confirmed distinguishing means. And the message is also memorized at the message memorizing section in the memory, as the information having an unconfirmed state, based on the distinguished result of the unconfirmed message confirmed distinguishing means. With this, the message is displayed at the displaying section at the state that the background picture is switched from the original picture to "informing", as the message is re-informing message.

Therefore, in the third embodiment as the same as the first and second embodiments, at the state setting both the sound and the vibration do not work, the message on the display is easily distinguished whether the message is the newly received message or the message has been confirmed and is displayed for re-reading.

And the judgement of the message displayed at the reading out operation becomes easy, at the judgement whether the message is re-displaying message that the message has been once displayed but has not been confirmed by the user or the message has been already confirmed. Therefore, the occurrence of the problem that the message has been actually confirmed by the user but has been stored in the memory as the unconfirmed message can be prevented.

Figure 18:
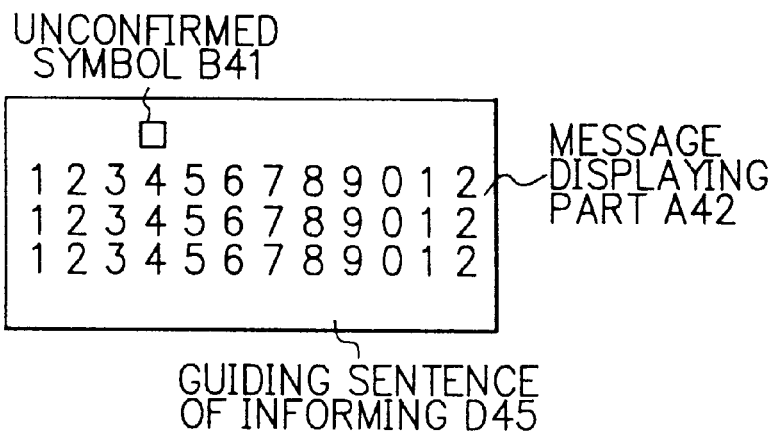
FIG. 18 is a diagram showing the construction of a displaying section of the fourth embodiment of the present invention.

Next, a fourth embodiment of the present invention is explained in detail. FIG. 17 is a diagram showing the construction of the controller and the memory of the fourth embodiment of the present invention. FIG. 18 is a diagram showing the construction of the displaying section of the fourth embodiment of the present invention.

Referring to FIGS. 17 and 18, the fourth embodiment of the present invention is explained in detail. The structural elements of the controller and the displaying section of the fourth embodiment are different from those of the mentioned above third embodiment. As shown in FIG. 17, in the controller 2 of the fourth embodiment, the background picture display controlling means furnished at the third embodiment is not provided, and an informing guidance adding means D28 is provided.

During the informing of message, based on the distinguished result of the informing confirmed distinguishing means A21, for example, at the case that the displaying section 4 displays in "n" lines (n≧2), the informing guidance adding means D28 adds a guiding sentence of informing D45 at the nth line of the message as shown in FIG. 18, in order to show that the message is unconfirmed and is being informing.

The same as the above mentioned embodiments, the object of the fourth embodiment is to provide the clear distinguishing functions that the informing state is shown at the time when a message is received and the message is re-informed for the confirmation, and the informing state is stopped at the reading out operation of the confirmed message.

In order to achieve this object, at the fourth embodiment, at the time when a message is received, the message is displayed on the displaying section 4 and the guiding sentence of informing D45 is also added to the message in order to show that the message is unconfirmed. And the confirming operation of the message by the user is watched by the informing confirmed distinguishing means A21 and the unconfirmed message confirmed distinguishing means A23. At the case that the confirming operation of the message by the user is implemented, the informing guidance adding means D28 deletes the guiding sentence of informing D45, based on the distinguished result of the informing confirmed distinguishing means A21.

At the case that the confirming operation of the message by the user is not implemented, the informing guidance adding means D28 deletes the guiding sentence of informing D45, based on the distinguished result of the informing confirmed distinguishing means A21. However, the controller 2 makes the information of automatic informing stop set at the information of automatic informing stop memorizing section A31 in the memory 3. Further, the message is memorized at the message memorizing section A32 in the memory 3 as the message of the unconfirmed state, based on the distinguished result of the unconfirmed message confirmed distinguishing means A23. With this, the unconfirmed message is displayed at the state that the guiding sentence of informing D45 is added as the re-informing message.

Figure 19:
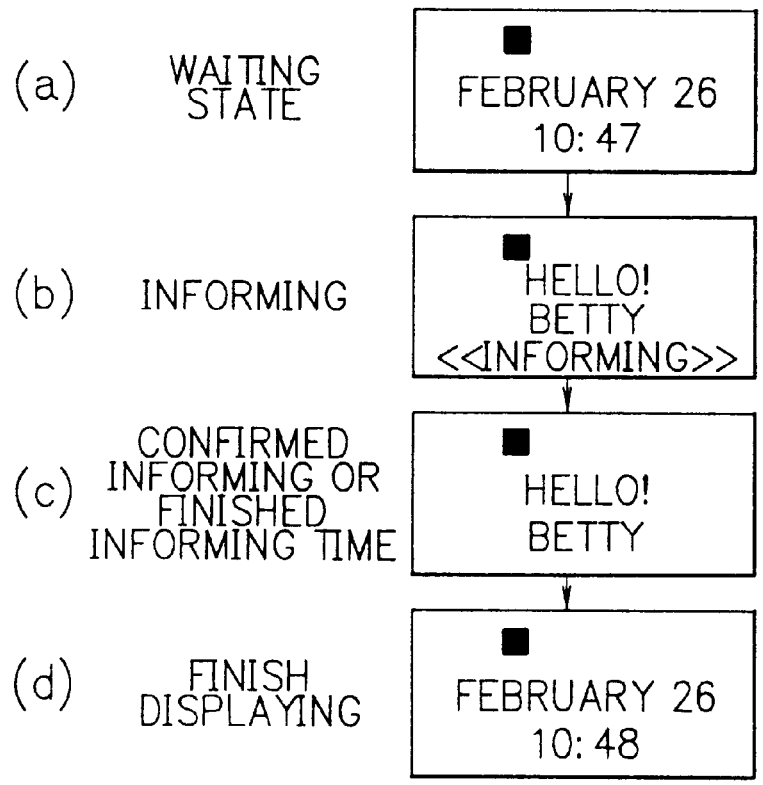
FIG. 19 is a displaying diagram showing a displaying example of the fourth embodiment of the present invention.

FIG. 19 is a displaying diagram showing a displaying example of the fourth embodiment of the present invention. Referring to FIG. 19, the display on the displaying section 4 at the time when a message is received is explained. At the waiting state shown in FIG. 19(*a*), the unconfirmed symbol B41 of the radio selective-calling receiver with the displaying function stays in turning on and it shows that unconfirmed message exists. At the time when a message is received, the contents of the received message is displayed and the guiding sentence of informing D45 is also added to the message in order to make informing notice as shown in FIG. 19(*b*). At the case that the informing stop (confirmed operation of the message) is implemented by a switch operation or the informing stop is not implemented within the predetermined time by a switch operation, the guiding sentence of informing D45 is deleted as shown in FIG. 19(*c*). Further, at the time when the switch operation of the displaying finish is implemented, the message displaying is finished as shown in FIG. 19(*d*). At this time, at the case that the unconfirmed message exists, the unconfirmed symbol B41 stays in turning on and the operation changes to the waiting state.

The display of re-informing is explained. At the case that the radio selective-calling receiver with the displaying function is at the waiting state, and the user did not confirm the message at the time when the message was received (the information of automatic informing stop exists), the contents of the message are displayed and the guiding sentence of informing D45 is also added in order to make the user notice that the message is re-informing as shown in FIG. 19(*b*). At the case that the informing stop operation (confirmed operation of the message) is implemented by the switch operation or the informing stop operation is not implemented by the switch operation within the predetermined time, the guiding sentence of informing D45 is deleted from the message as shown in FIG. 19(*c*). Further, the displaying finish operation by the switch operation is implemented or the predetermined time of the timer 6 has passed, then the displaying of the message is finished. At the time when the unconfirmed messages exist, the unconfirmed symbol B41 stays in turning on and the displaying section 4 changes to the waiting state.

Figure 20:
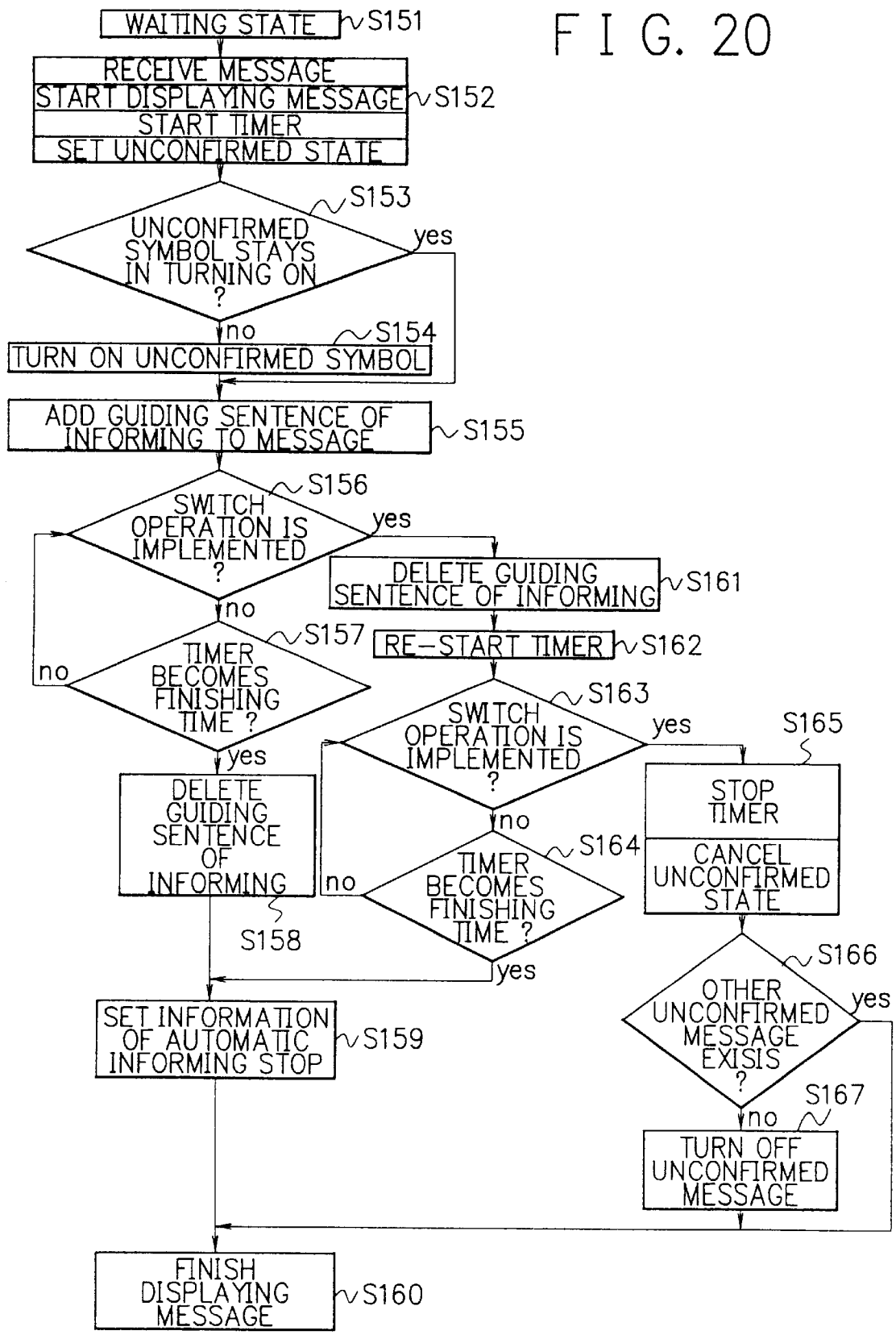
FIG. 20 is a flowchart showing the informing operation at the time when the message is received in the fourth embodiment of the present invention.

FIG. 20 is a flowchart showing the informing operation at the time when the message is received in the fourth embodiment of the present invention. Referring to FIG. 20, the informing operation is explained in detail. The operation is explained at the state that the informing operation is implemented only by the display set by the informing output controlling means A25 at the time when the message is received and the message is re-informed. At the case that a message addressed to own receiver is received at a waiting state (step S151), the receiving circuit 1 takes out the demodulated signals from the received radio signals addressed to own receiver and outputs the signals to the controller 2. The controller 2 makes the memory 3 memorize the message from the outputted demodulated signals. And at the same time the controller 2 makes the displaying section 4 display the contents of the message (start displaying message). And also at the same time, a timer 6 watching the switch 5 is started. At this time, an unconfirmed state is set for the received message (step S152).

The controller 2 examines whether the unconfirmed symbol B41 stays in turning on or not (step S153), at the case that the unconfirmed symbol B41 does not stay in turning on (no of step S153), the unconfirmed symbol B41 is made to turn on (step S154). After this, the guiding sentence of informing D45 is added to the message in order to show that the received message is in an informing state (step S155). And the controller 2 watches the switch operation by the user until the timer 6 becomes the finishing time (step S156). At the case that the switch operation is not implemented (no of step S156) and the timer becomes the finishing time (yes of step S157), the guiding sentence of informing D45 is deleted from the message, this means that the informing state is finished (step S158). After this, the controller 2 sets the information of automatic informing stop in the memory 3 (step S159) and the displaying message is finished (step S160) and the operation is returned to the waiting state (step S151).

At the step S156, at the case that the switch operation is implemented before the timer 6 becomes finishing time (yes of step S156), the controller 2 deletes the guiding sentence of informing D45 from the message (step S161). At this time, the controller 2 stops the timer 6 and makes the timer 6 re-start (step S162). And the controller 2 watches the switch operation by the user until the timer 6 becomes the finishing time (step S163). And at the case that the switch operation is not implemented until the timer 6 becomes the finishing time (no of step S163 and yes of step S164), judging that the message confirming operation by the user is not implemented. And the controller 2 sets the information of the automatic informing stop in the memory 3 (step S159), and the displaying message is finished (step S160).

At the step S163, at the case that the switch operation by the user is implemented (yes of step S163), the controller 2 stops the timer 6 and also cancels the unconfirmed state of the message (step S165). After this, the controller 2 retrieves the messages of the unconfirmed state from the message memorizing section A32 in the memory 3. At the case that the unconfirmed message does not exist (no of step S166), the controller 2 makes the unconfirmed symbol B41 turn off (step S167) and finishes displaying the message (step S160). At the case that the unconfirmed messages exists (yes of step S166), the controller 2 makes the unconfirmed symbol B41 stay in turning on and finishes displaying the message (step S160).

FIG. 21 is a flowchart showing the operation when the re-informing operation is implemented at the fourth embodiment. Referring to FIG. 21, the re-informing operation is explained in detail. At the case that the message confirmation is implemented from the waiting state (step S171), the controller 2 watches the switch operation, and at the case that the switch operation is implemented (yes of step S172), the controller 2 makes the timer 6 start (step S173). The controller 2 distinguishes whether the information of automatic informing stop is set or not at the memory 3. At the case that the information of automatic informing stop does not exist (no of step S174), the controller 2 takes out the message from the message memorizing section A32 and displays the confirmed re-reading message (step S175). After this, the controller 2 watches the switch 5 until the switch operation is implemented during the time that the timer 6 works. The switch operation is not implemented (no of step S176) and the timer 6 becomes the finishing time (yes of step S177), and then the controller 2 finishes displaying the message (step S179).

At the step S176, at the case that the switch operation is implemented (yes of step S176), the timer 6 is stopped (step S178) and the operation corresponding to the switch operation is implemented. After this, the operation becomes the waiting state, and the receiving or the switch operation is waited.

At the step S174, at the case that the controller 2 distinguishes that the information of automatic informing stop exists (yes of step S174), the controller 2 starts the displaying the latest received unconfirmed message (step S180). At the same time, the guiding sentence of informing D45 is added to the message in order to show that the message is a re-informing message (step S181). After this, the controller 2 watches the switch 5 until the switch operation is implemented during the time that the timer 6 works. The switch operation is not implemented (no of step S182) and the timer 6 becomes the finishing time (yes of step S183). And then the controller 2 judges that the confirming operation by the user is not implemented and deletes the guiding sentence of informing D45 from the message (step S184).

At the step S182, at the case that the switch operation is implemented (yes of step S182), the timer 6 is stopped and is made to re-start. At the same time, the information of automatic informing stop is canceled and the unconfirmed state of the messages being outputting is canceled (step S185). After this, the controller 2 judges that the informing stop operation is implemented by the switch operation and deletes the guiding sentence of informing D45 from the message (step S186). And the controller 2 watches the switch 5 until the switch operation is implemented during the time that the timer 6 works (step S187).

At the case that the switch operation is not implemented (no of step S187) and the timer 6 becomes finishing time (yes of step S189), the controller 2 retrieves the messages of unconfirmed state from the message memorizing section A32 (step S190). At the case that the unconfirmed messages do not exist (no of step S190), the unconfirmed symbol B41 is made to turn off (step S191).

At the step S187, at the case that the switch operation is implemented (yes of step S187), the timer 6 is made to stop (step S188), the controller 2 retrieves the messages of unconfirmed state from the message memorizing section A32 (step S190). At the case that the unconfirmed messages exist (yes of step S190), the unconfirmed symbol B41 is made to stay in turning on and the displaying message is finished (step S179).

As mentioned above, in the fourth embodiment of the present invention, at the time of receiving, the received message is displayed on the display and also the guiding sentence of informing is added to the message in order to show that the message is unconfirmed. And the confirming operation of the message by the user is watched by the informing confirmed distinguishing means and the unconfirmed message confirmed distinguishing means. And at the case that the confirming operation of the message by the user is not implemented, the information of automatic informing stop is set at the information of automatic informing stop memorizing section in the memory, based on the distinguished result of the informing confirmed distinguishing means. And the message is also memorized at the message memorizing section in the memory, as the information having an unconfirmed state, based on the distinguished result of the unconfirmed message confirmed distinguishing means. With this, the message is displayed at the displaying section at the state that the guiding sentence of informing is added to the message as the message is re-informing message.

Therefore, in the fourth embodiment as the same as the first, second and third embodiments, at the state setting both the sound and the vibration do not work, the message on the display is easily distinguished whether the message is the newly received message or the message has been confirmed and is displayed for re-reading.

And the judgement of the message displayed at the reading out operation becomes easy, at the judgement whether the message is re-displaying message that the message has been once displayed but has not been confirmed by the user or the message has been already confirmed. Therefore, the occurrence of the problem that the message has been actually confirmed by the user but has been stored in the memory as the unconfirmed message can be prevented.

As clearly mentioned in the above embodiments, the radio selective-calling receiver with the displaying function of the present invention displays the message on the display at the time when the message is received and also displays the predetermined display expressing that the message is an unconfirmed message. And the receiver watches the confirming operation by the user by the informing confirmed distinguishing means and the unconfirmed message confirmed distinguishing means. And at the case that the confirming operation of the message by the user is not implemented, the information of automatic informing stop is set at the information of automatic informing stop memorizing section in the memory, based on the distinguished result of the informing confirmed distinguishing means. And the message is also memorized at the message memorizing section in the memory, as the information having an unconfirmed state, based on the distinguished result of the unconfirmed message confirmed distinguishing means. With this, at the time when the unconfirmed message is displayed again on the display, the message is displayed at the displaying section, at the state that the predetermined display showing that the message is the unconfirmed message is on the display.

Therefore, at the radio selective-calling receiver with the displaying function of the present invention, at the state setting both the sound and the vibration do not work, the message on the display is easily distinguished whether the message is the newly received message or the message has been confirmed and is only displayed for re-reading.

And the judgement of the message displayed at the reading out operation becomes easy, at the judgement whether the message is re-displaying message that the message has been once displayed but has not been confirmed by the user or the message has been already confirmed. Therefore, the occurrence of the problem that the message has been actually confirmed by the user but has been stored in the memory as the unconfirmed message can be prevented. And the problem that the same message is repeatedly displayed at the time of reading out of messages is prevented.

Furthermore, an LED (light emitting diode) is not needed to show that the message is an unconfirmed message, therefore the power consumption can be reduced. And the number of components can be reduced by the same reason.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio selective-calling receiver with a displaying function, which stores messages included in selective-calling signals in a memory means when receiving the selective-calling signals addressed to own receiver and reads the stored messages out of the memory means to display the messages on a displaying means, and stores a message for which a user has not performed confirmation operation inputting for a given length of time in the memory means as an unconfirmed message having an unconfirmed attribute, the radio selective-calling receiver comprising:

the displaying means for displaying a first display when the memory means stores the unconfirmed message which has been displayed on the displaying means but for which the user has not performed confirmation operation inputting, and a second display when the unconfirmed message and/or a newly received message is displayed in the displaying means;

an unconfirmed message determining means for determining whether or not a message stored in the memory means is the unconfirmed message;

an informing confirmation determining means for determining whether or not the user has performed confirmation operation inputting with respect to a message displayed on the displaying means; and a display controlling means for switching the display of the displaying means according to a determination result obtained by the unconfirmed message determining means and the informing confirmation determining means.

2. The radio selective-calling receiver with a displaying function in accordance with claim 1, wherein:

the first display is a first symbol lighting which is in a turning off state when the unconfirmed message is not stored in the memory means; and the second display is the first symbol lighting in a flashing state.

3. The radio selective-calling receiver with a displaying function in accordance with claim 1, wherein:

the first display is a first symbol lighting which is in a turning off state when the unconfirmed message is not stored in the memory means; and the second display is a second symbol lighting which is turned on only when the newly received message is displayed on the displaying means.

4. The radio selective-calling receiver with a displaying function in accordance with claim 1, wherein:

the first display is a first symbol lighting which is in a turning off state when the unconfirmed message is not stored in the memory means; and the second display is a background image which is displayed only when the unconfirmed message and/or the newly received message is displayed on the displaying means.

5. The radio selective-calling receiver with a displaying function in accordance with claim 1, wherein:

the first display is a first symbol lighting which is in a turning off state when the unconfirmed message is not stored in the memory means; and the second display is prescribed character information which is displayed only when the unconfirmed message and/or the newly received message is displayed on the displaying means.

6. A radio selective-calling receiver with a displaying function, the radio selective-calling receiver comprising:

a memory means for storing received messages;

a displaying means for displaying the messages stored in the memory means;

an operation inputting means for inputting settings by a user;

a timing means for timing the display time of a message displayed on the displaying means; and a controlling means for controlling the respective means; wherein:

the displaying means is provided with a symbol which changes display states so as to indicate that a message displayed on the displaying means is an unconfirmed message for which a user has not performed confirmation operation inputting and that the unconfirmed message is stored in the memory means;

the memory means includes a message storing section for storing received messages, an unconfirmed attribute storing section for storing messages for which a user has not performed confirmation operation inputting for a given length of time after displaying them on the displaying means as unconfirmed messages each having an unconfirmed attribute, and an automatic informing stop information storing section for storing automatic informing stop information to determine whether or not the unconfirmed message is stored in the memory means;

the controlling means includes an unconfirmed message determining means for determining whether or not the user has performed confirmation operation inputting for a message displayed on the displaying means and controls the unconfirmed attribute with respect to each message, an informing confirmation determining means for determining whether or not the user has performed confirmation operation inputting for the unconfirmed message displayed on the displaying means and controls the automatic informing stop information, and a display controlling means for switching the display states of the symbol according to a determination result obtained by the unconfirmed message determining means and the informing confirmation determining means;

the controlling means, when storing a newly received message in the memory means and reading the message out of the memory means to display the message on the displaying means, makes the symbol flash to indicate that the new message is received, and monitors the operation inputting from the operation inputting means for a prescribed period of time by the informing confirmation determining means and the unconfirmed message determining means;

the controlling means, in the case where the operation inputting from the operation inputting means has not been detected for a prescribed period of time by the informing confirmation determining means and the unconfirmed message determining means, switches the symbol from a flashing state to a turning on state by the display controlling means, sets the automatic informing stop information in the automatic informing stop information storing section, and also sets the unconfirmed attribute of an unconfirmed message having been displayed on the display means in the unconfirmed attribute storing section;

the controlling means, in the case where the operation inputting from the operation inputting means has been detected within a prescribed period of time by the informing confirmation determining means and the unconfirmed message determining means, switches the symbol from a flashing state to a turning on state by the display controlling means, and determines whether or not the unconfirmed attribute storing section stores another message having the unconfirmed attribute, if any, the controlling means leaves the symbol in the turning on state, and if not, the controlling means turns off the symbol;

the controlling means, in the case where the operation inputting for reading a message is performed from the operation inputting means in the state that the automatic informing stop information is set in the automatic informing stop information storing section, displays a message having the unconfirmed attribute on the displaying means, switches the symbol from a turning on state to a flashing state by the display controlling means, and monitors the operation inputting from the operation inputting means for a period of time by the informing confirmation determining means and the unconfirmed message determining means;

the controlling means, in the case where the operation inputting from the operation inputting means has not been detected for a prescribed period of time by the informing confirmation determining means and the unconfirmed message determining means, switches the symbol from a flashing state to a turning on state by the display controlling means, and determines whether or not the unconfirmed attribute storing section stores another message having the unconfirmed attribute; and the controlling means, in the case where the operation inputting from the operation inputting means has been detected within a prescribed period of time by the informing confirmation determining means and the unconfirmed message determining means, switches the symbol from a flashing state to a turning on state by the display controlling means, cancels the unconfirmed attribute of the message displayed on the displaying means, and determines whether or not the unconfirmed attribute storing section stores another message having the unconfirmed attribute, if any, the controlling means displays the unconfirmed message on the displaying means and switches the symbol from a turning on state to a flashing state, and if not, the controlling means turns off the symbol by the display controlling means and resets the automatic informing stop information stored in the automatic informing stop information storing section.

7. A radio selective-calling receiver with a displaying function, the radio selective-calling receiver comprising:

a memory means for storing received messages;

a displaying means for displaying the messages stored in the memory means;

an operation inputting means for inputting settings by a user;

a timing means for timing the display time of a message displayed on the displaying means; and a controlling means for controlling the respective means; wherein:

the displaying means displays a first display for indicating a message displayed on the displaying means is an unconfirmed message for which the user has not performed confirmation operation inputting, a second display when the display of the unconfirmed message is terminated, a third display when the unconfirmed message is stored in the memory means, and a fourth display when no unconfirmed message is stored in the memory means;

the memory means includes a message storing section for storing received messages, an unconfirmed attribute storing section for storing messages for which a user has not performed confirmation operation inputting for a given length of time after displaying them on the displaying means as unconfirmed messages each having an unconfirmed attribute, and an automatic informing stop information storing section for storing automatic informing stop information to determine whether or not the unconfirmed message is stored in the memory means;

the controlling means includes an unconfirmed message determining means for determining whether or not the user has performed confirmation operation inputting for a message displayed on the displaying means and controls the unconfirmed attribute with respect to each message, an informing confirmation determining means for determining whether or not the user has performed confirmation operation inputting for the unconfirmed message displayed on the displaying means and controls the automatic informing stop information, a first switching means for switching the first display and the second display according to a determination result obtained by the informing confirmation determining means and the unconfirmed message determining means, and a second switching means for switching the third display and the fourth display according to a determination result obtained by the unconfirmed message determining means;

the controlling means, when storing a newly received message in the memory means and reading the message out of the memory means to display the message on the displaying means, displays the first display to indicate that the new message is received, and monitors the operation inputting from the operation inputting means for a prescribed period of time by the informing confirmation determining means and the unconfirmed message determining means;

the controlling means, in the case where the operation inputting from the operation inputting means has not been detected for a prescribed period of time by the informing confirmation determining means and the unconfirmed message determining means, switches the display of the displaying means from the first display to the second display by the first switching means, sets the automatic informing stop information in the automatic informing stop information storing section, and also sets the unconfirmed attribute of an unconfirmed message having been displayed on the display means in the unconfirmed attribute storing section while displaying the third display on the display section;

the controlling means, in the case where the operation inputting from the operation inputting means has been detected within a prescribed period of time by the informing confirmation determining means and the unconfirmed message determining means, switches the display of the displaying means from the first display to the second display by the first switching means, and determines whether or not the unconfirmed attribute storing section stores another message having the unconfirmed attribute, if any, the controlling means displays the third display on the display section, and if not, the controlling means displays the fourth display on the display section;

the controlling means, in the case where the operation inputting for reading a message is performed from the operation inputting means in the state that the automatic informing stop information is set in the automatic informing stop information storing section, displays a message having the unconfirmed attribute on the displaying means, switches the second display displayed on the displaying means to the first display, and monitors the operation inputting from the operation inputting means for a prescribed period of time by the informing confirmation determining means and the unconfirmed message determining means;

the controlling means, in the case where the operation inputting from the operation inputting means has not been detected for a prescribed period of time by the informing confirmation determining means and the unconfirmed message determining means, switches the first display to the second display by the first switching means, and determines whether or not the unconfirmed attribute storing section stores another message having the unconfirmed attribute; and the controlling means, in the case where the operation inputting from the operation inputting means has been detected within a prescribed period of time by the informing confirmation determining means and the unconfirmed message determining means, switches the first display to the second display by the first switching means, cancels the unconfirmed attribute of the message displayed on the displaying means, and determines whether or not the unconfirmed attribute storing section stores another message having the unconfirmed attribute, if any, the controlling means displays the unconfirmed message on the displaying means and switches the second display to the first display, and if not, the controlling means switches the third display to the fourth display by the second switching means and resets the automatic informing stop information stored in the automatic informing stop information storing section.

8. The radio selective-calling receiver with a displaying function in accordance with claim 7, wherein:

the first display is an informing symbol in a turning on state which indicates that the unconfirmed message is displayed on the displaying means;

the second display is the informing symbol in a turning off state;

the third display is an unconfirmed symbol in a turning on state which indicates that at least one unconfirmed message is stored in the memory means;

the fourth display is the unconfirmed symbol in a turning off state;

the first switching means switches on or off the informing symbol according to the determination result obtained by the informing confirmation determining means; and the second switching means switches on or off the unconfirmed symbol according to the determination result by the unconfirmed message determining means unconfirmed message determining means.

9. The radio selective-calling receiver with a displaying function in accordance with claim 7, wherein:

the first display is an informing symbol in a flashing state which indicates that the unconfirmed message is displayed on the displaying means;

the second display is the informing symbol in a turning on state;

the third display is an unconfirmed symbol in a turning on state which indicates that at least one unconfirmed message is stored in the memory means;

the fourth display is the unconfirmed symbol in a turning off state;

the first switching means switches the flashing state and turning on state of the informing symbol according to the determination result obtained by the informing confirmation determining means; and the second switching means switches on or off the unconfirmed symbol according to the determination result by the unconfirmed message determining means.

10. A radio selective-calling receiver with a displaying function in accordance with claim 7, wherein:

the first display is the flashing state of a background for a message displaying area displaying messages;

the second display is the background in a turning on state;

the third display is an unconfirmed symbol in a turning on state which indicates that at least one unconfirmed message is stored in the memory means;

the fourth display is the unconfirmed symbol in a turning off state;

the first switching means switches on or off the background according to the determination result obtained by the informing confirmation determining means; and the second switching means switches on or off the unconfirmed symbol according to the determination result obtained by the unconfirmed message determining means.

11. A radio selective-calling receiver with a displaying function in accordance with claim 7, wherein:

the first display is the display of a background which indicates that a message displayed on the displaying means is an unconfirmed message;

the second display is the background in a turning off state;

the third display is an unconfirmed symbol in a turning on state which indicates that at least one unconfirmed message is stored in the memory means;

the fourth display is the unconfirmed symbol in a turning off state;

the first switching means switches the displaying state and turning off state of the background according to the determination result obtained by the informing confirmation determining means; and the second switching means switches on or off the unconfirmed symbol according to the determination result obtained by the unconfirmed message determining means.

12. A radio selective-calling receiver with a displaying function in accordance with claim 7, wherein:

the first display is prescribed character information displayed on the message displaying area displaying the message;

the second display is the character information in a non-display state;

the third display is an unconfirmed symbol in a turning on state which indicates that at least one unconfirmed message is stored in the memory means;

the fourth display is the unconfirmed symbol in a turning off state;

the first switching means switches the display state and non-display state of the character information according to the determination result by the informing confirmation determining means; and the second switching means switches on or off the unconfirmed symbol according to the determination result obtained by the unconfirmed message determining means.

* * * * *